(12) United States Patent
Yanagawa et al.

(10) Patent No.: US 7,408,609 B2
(45) Date of Patent: Aug. 5, 2008

(54) ACTIVE-MATRIX LIQUID CRYSTAL DISPLAY

(75) Inventors: Kazuhiko Yanagawa, Mobara (JP);
Masuyuki Ohta, Mobara (JP);
Kazuhiro Ogawa, Mobara (JP);
Keiichiro Ashizawa, Mobara (JP);
Masahiro Yanai, Mobara (JP);
Nobutake Konishi, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/860,039

(22) Filed: Sep. 24, 2007

(65) Prior Publication Data
US 2008/0024711 A1 Jan. 31, 2008

Related U.S. Application Data

(60) Continuation of application No. 11/511,292, filed on Aug. 29, 2006, now Pat. No. 7,289,182, which is a continuation of application No. 11/144,619, filed on Jun. 6, 2005, now Pat. No. 7,102,711, which is a division of application No. 10/670,226, filed on Sep. 26, 2003, now Pat. No. 6,927,816, which is a continuation of application No. 09/904,835, filed on Jul. 16, 2001, now Pat. No. 6,654,092, and a continuation of application No. 09/029,747, filed as application No. PCT/JP96/02562 on Sep. 9, 1996, now Pat. No. 6,266,117.

(30) Foreign Application Priority Data
Sep. 14, 1995 (JP) .................................. 7-236370

(51) Int. Cl.
*G02F 1/1343* (2006.01)
*G02F 1/1333* (2006.01)

(52) U.S. Cl. .................................... 349/141; 349/111
(58) Field of Classification Search ................ 349/141, 349/111, 144
See application file for complete search history.

(56) References Cited

U.S. PATENT DOCUMENTS 4,687,298 A * 8/1987 Aoki et al. .................... 349/44
4,867,537 A * 9/1989 Aoki et al. ................... 349/111
5,748,275 A * 5/1998 Sato et al. .................... 349/144

FOREIGN PATENT DOCUMENTS

| JP | 6-273802 | 9/1994 |
|---|---|---|
| JP | 8-101396 | 4/1996 |

* cited by examiner

*Primary Examiner*—James A Dudek
(74) *Attorney, Agent, or Firm*—Antonelli, Terry, Stout & Kraus, LLP.

(57) ABSTRACT

An active matrix liquid crystal display device includes a pair of substrates and a liquid crystal layer, a video signal lines and scan signal lines delimiting pixel areas having pixel electrodes and display electrodes, reference electrodes and active devices. The display electrodes are arranged on one of the substrates, and the reference electrodes are arranged on another of the substrates. A part of the reference electrodes have a first layer formed in the substrate side and a second layer formed in the liquid crystal layer side. Each of the display electrodes and the reference electrodes has a slit, the slit of the display electrodes and the slit of the reference electrodes being shifted with respect to one another in plan view.

7 Claims, 24 Drawing Sheets

ACTIVE-MATRIX LIQUID CRYSTAL DISPLAY

CROSS REFERENCE TO RELATED APPLICATION

This is a continuation application of U.S. Ser. No. 11/511,292, filed Aug. 29, 2006, now U.S. Pat. No. 7,289,182 which is a continuation of U.S. Ser. No. 11/144,619, filed Jun. 6, 2005, now U.S. Pat. No. 7,102,711, which is a divisional application of U.S. Ser. No. 10/670,226, Filed Sep. 26, 2003, now U.S. Pat. No. 6,927,816, which is a continuation of U.S. application Ser. No. 09/904,835, filed Jul. 16, 2001, now U.S. Pat. No. 6,654,092, and U.S. application Ser. No. 09/029,747, filed Mar. 2, 1998, now U.S. Pat. No. 6,266,117, which is a 371 of PCT/JP96/02562, filed Sep. 9, 1996, the subject matter of which is incorporated by reference herein.

FIELD OF THE INVENTION

The present invention relates to an active-matrix liquid crystal display device, and particularly to a liquid crystal display device of the so-called in-plane field type.

BACKGROUND OF THE INVENTION

In color liquid crystal display devices of the in-plane field type, one or both of two transparent substrates placed opposite to each other, with a liquid crystal layer disposed in between, have display electrodes and reference electrodes arranged in areas on the sides of the liquid crystal corresponding to unit pixels, and an electric field parallel to the transparent substrate surface is produced between the display electrodes and the reference electrodes to modulate light passing through the liquid crystal layer.

Such a color liquid crystal display device can produce a picture that can be recognized at a wide viewing angle and has become known for its excellence in the so-called wide angle visual field.

Liquid crystal display devices with the above configuration are described in detail, for example, in the Published Japanese Translation of PCT International Publication for Japanese Patent Application No. 505247/1993, Japanese Patent Publication No. 21907/1988, and Japanese Patent Laid-Open No. 160878/1994.

It has been pointed out that liquid crystal display devices of this configuration, however, have a problem in that an undesired electric field produced from the video signal line changes the electric field between the display electrodes and the reference electrodes, causing so-called vertical smear extending along the video signal line on the display surface. A known means to solve this problem involves the use of a shield electrode on the same substrate close to the video signal line (see Japanese Patent Laid-Open No. 202127/1994).

Liquid crystal display devices thus structured, however, have a problem in that, because the shield electrode is provided on the same substrate, the capacitance between the shield electrode and the signal electrode is large, the load on the drive circuit becomes too heavy, and the power consumption or the size of the drive circuit becomes too large.

Liquid crystal display devices thus constructed have another problem in that, because opaque electrodes are formed like a comb, the percentage of the pixel area occupied by the opaque metal is high, and so the aperture ratio cannot be increased.

Further, because a voltage is applied to the reference electrodes formed in individual pixel areas through common stripe-shaped reference signal lines extending in a row or column direction, the waveform of the applied voltage becomes dull from the signal supply portions of the reference signal lines toward the far ends of the reference signal lines, with the result that a brightness gradient or so-called horizontal smear occurs with the reference signal lines on the display surface.

The present invention has been accomplished to avoid these circumstances and an object thereof is to provide a liquid crystal display device that minimizes so-called vertical smear and reduces power consumption and the size of the peripheral circuits.

Another object of this invention is to provide a liquid crystal display device having an improvement in the so-called aperture ratio.

Still another object of this invention is to provide a liquid crystal display device in which what is generally-called a brightness gradient and also the horizontal smear are suppressed.

A further object of this invention is to provide a liquid crystal cell with a low reflectance.

SUMMARY OF THE INVENTION

Representative aspects of this invention disclosed in this specification may be briefly summarized as follows.

An active-matrix liquid crystal display device, which is applicable to the present invention comprises transparent substrates opposed to each other; a liquid crystal layer interposed between the opposed transparent substrates; pixel areas arranged on the surfaces of the transparent substrates on the liquid crystal side; and display electrodes, reference electrodes, scan lines, video signal lines and active devices arranged in the pixel areas; wherein a voltage is applied between the display electrodes and the reference electrodes to produce an electric field parallel to the transparent substrates in the liquid crystal layer to modulate light passing through the liquid crystal layer. A first aspect of the invention is characterized in that, on one of the transparent substrates, the reference electrodes are arranged on both sides of the video signal lines, and on the other transparent substrate, a shield electrode is formed to cover in plan view the video signal lines in the pixel areas and a part of the reference electrodes on both sides of the video signal lines.

An active-matrix liquid crystal display device which comprises: transparent substrates opposed to each other; a liquid crystal layer interposed between the opposed transparent substrates; pixel areas arranged on the surfaces of the transparent substrates on the liquid crystal side; and display electrodes, reference electrodes, scan lines, video signal lines and active devices arranged in the pixel areas; wherein a voltage is applied between the display electrodes and the reference electrodes to produce an electric field parallel to the transparent substrates in the liquid crystal layer to modulate light passing through the liquid crystal layer; the aspect of the invention is characterized in that, on the other transparent substrate opposed to the one transparent substrate formed with the video signal lines, a shield electrode is formed completely overlapping the video signal lines in plan view and is formed integrally with the reference electrodes; and the video signal lines for allowing the display electrodes to function and the reference signal lines connected with the reference electrodes are completely superimposed when seen in plan view.

In accordance with the invention, the shield electrode is electrically connected to the light shielding layer having apertures only at the pixel areas or is integrally formed with the light shielding layer.

In the active-matrix liquid crystal display device which comprises: transparent substrates placed opposed to each other; a liquid crystal layer interposed between the opposed transparent substrates; pixel areas arranged on the surface of one of the transparent substrates on the liquid crystal side; display electrodes, scan signal lines, video signal lines and active devices arranged in the pixel areas; and a conductive light shielding layer formed in matrix, provided in the pixel areas on the other transparent substrate and supplied with a reference signal; wherein a voltage is applied between the light shielding layer and the display electrodes to produce an electric field having a component parallel to the transparent substrates to modulate light passing through the liquid crystal layer; the third aspect of the invention is characterized in that the light shielding layer has a multilayer structure comprising a layer with a reflectance of 10% or less on the transparent substrate side and a highly conductive layer on the liquid crystal layer side; that a backlight unit is disposed on the side of the transparent substrate provided with the display electrodes, the scan signal lines, the video signal lines and the active devices, opposite to the liquid crystal layer; and that the transparent substrate provided with the display electrodes, the scan signal lines, the video signal lines and the active devices has thereon a connection terminal for supplying the reference signal to the light shielding layer and a conductive layer fox electrically connecting the connection terminal to the light shielding layer.

In accordance with the first aspect of the present invention, because the video signal lines and the reference electrodes adjacent to the video signal lines, both formed on one of the transparent substrates, are completely superimposed, in plan view, by the shield electrode formed on the other transparent substrate, unwanted electric lines of force generated by the video signal lines are terminated at the shield electrode and the reference electrodes adjacent to the video signal lines, thus preventing the electric field between the display electrodes and the reference electrodes from varying depending on the video signal, and greatly minimizing the vertical smear.

Further, because the shield electrodes are formed on the substrate opposite to the video signal lines, the shield electrodes and the video signal lines are spaced more from each other by the thickness of the liquid crystal layer, so that the capacitance between the shield electrodes and the video signal lines is reduced. This prevents the load on the drive circuit from increasing, minimizes power consumption and reduces the size of the drive circuit.

In accordance with the second aspect of the present invention, because the video signal lines for allowing the display electrodes to function and the reference signal lines connected with the reference electrodes are formed to completely overlap each other, when seen in plan view, the effective pixel areas can be increased, thus improving the so-called aperture ratio.

Further, because the reference electrodes are so formed as to be electrically connected to the light shielding layer having apertures only at the pixel areas, a voltage is applied through a low resistance to the reference electrode in each pixel area. As a result, the reference signal waveforms can be prevented from becoming dull, thus minimizing what is generally called a brightness gradient and the horizontal smear.

Furthermore, the third aspect of the present invention has the features of the first and second aspects combined and can reduce the reflectance of the liquid crystal display device.

DESCRIPTION OF THE PREFERRED EMBODIMENTS

Embodiment 1

Figure 2:
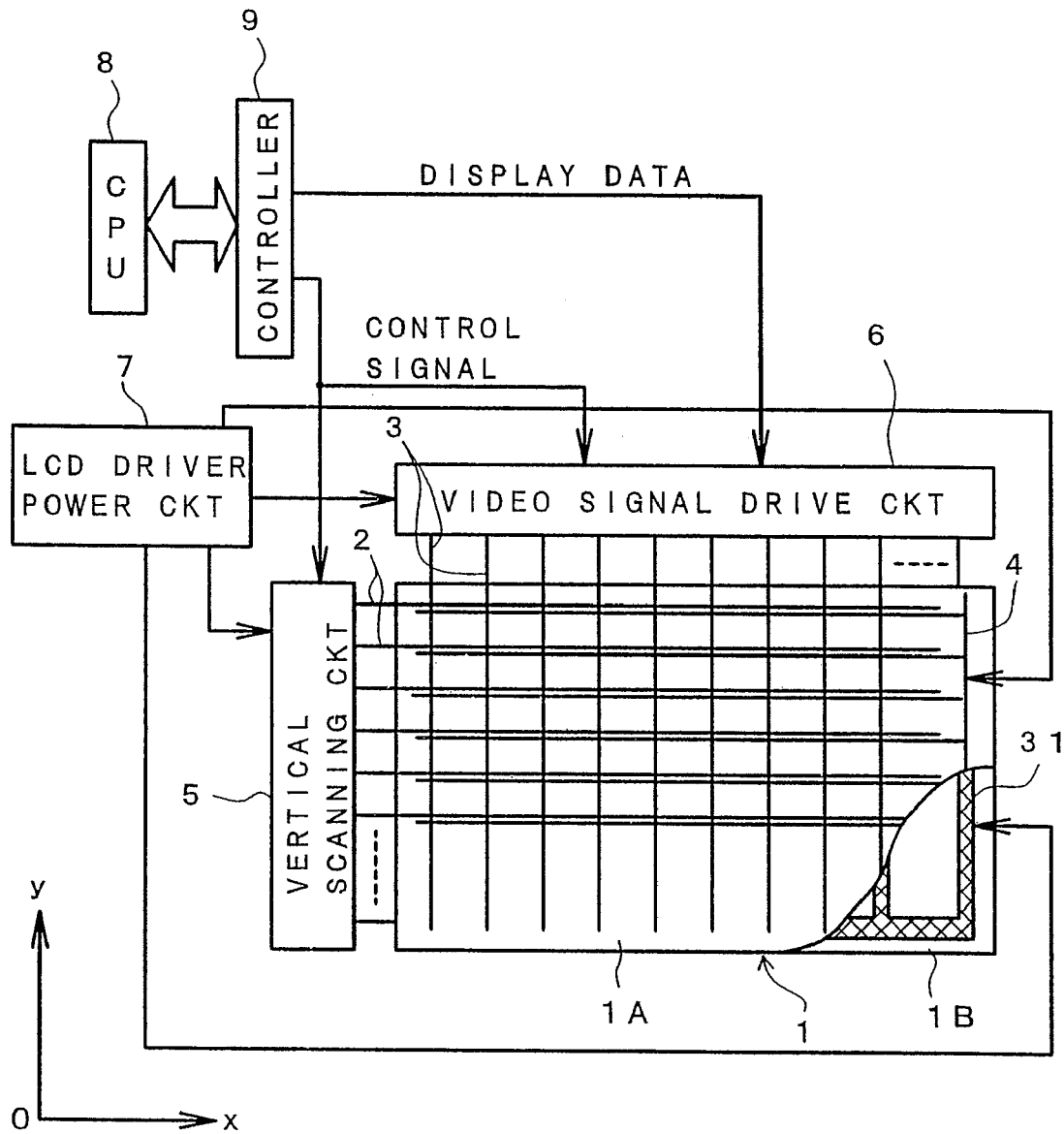
FIG. 2 is a schematic diagram showing the configuration of the liquid crystal display device of Embodiment 1 and its peripheral circuits.

FIG. 2 is a diagram showing the configuration of one Embodiment of the liquid crystal display device of the present invention and its peripheral circuits.

In the figure, liquid crystal display device 1 has as its enclosure a transparent substrate 1A and a transparent substrate 1B with a liquid crystal layer interposed therebetween. On the surface of the transparent substrate 1A, which is a so-called lower substrate, on the liquid crystal layer side, are formed scan signal lines 2 and reference signal lines 4 that extend in the x direction in the figure and are parallelly arranged in the y direction. The scan signal lines 2 and the reference signal lines 4 are arranged alternately such that a first reference signal line 4 is provided close to a first scan signal line 2 in the (−) y direction, a second scan signal line 2 is greatly spaced from the first reference signal line 4 in the (−) y direction, a second reference signal line 4 is provided close to the second scan signal line 2 in the (−) y direction, and so on. Insulated from these signal lines 2 and 4, video signal lines 3 are formed so as to extend in the y direction and are parallelly arranged in the x direction.

Relatively large rectangular areas enclosed by the scan signal lines 2 and reference signal lines 4 and the video signal lines 3 constitute pixel areas, which are arranged in a matrix to form a display unit.

In each pixel area a display electrode is formed and a thin film transistor TFT and a storage capacitor Cstg are arranged in a part of the periphery of the pixel area. (None of these is shown.)

On the surface of the transparent substrate 1B, on the liquid crystal layer side, a shield electrode 31 is formed to overlap the video signal lines 3, extending in the y direction in the figure and parallelly arranged in the x direction. The shield electrode 31 is provided to terminate the electric field from the video signal lines 3 to reduce a leakage field from the video signal lines 3 into the pixel, thereby minimizing vertical smear caused by such a leakage field.

The liquid crystal display device 1 has as external circuits a vertical scanning circuit 5 and a video signal drive circuit 6. The vertical scanning circuit 5 supplies a scan signal (voltage) to the scan signal lines 2 successively, and the video signal drive circuit 6 supplies video signals (voltages) to the video signal lines 3 in synchronism with the scan signals.

The vertical scanning circuit 5 and the video signal drive circuit 6 are each supplied with electricity from an LCD driver power circuit 7, and also with display data and a control signal, separated from image information received from a CPU 8 by a controller 9.

The LCD driver power circuit 7 also supplies voltages to the reference signal lines 4 and the shield electrode 31. This embodiment uses an AC voltage as the voltage applied to the reference signal lines 4 to lower the dielectric strength of the video signal drive circuit 6. The shield electrode 31 is supplied with the same potential as the reference signal line, so that the in-plane field is provided in the display area between the display electrode and the reference electrode more efficiently. The shield electrode 31 may also be connected to the reference earth potential of the LCD driver power circuit 7.

Figure 1:
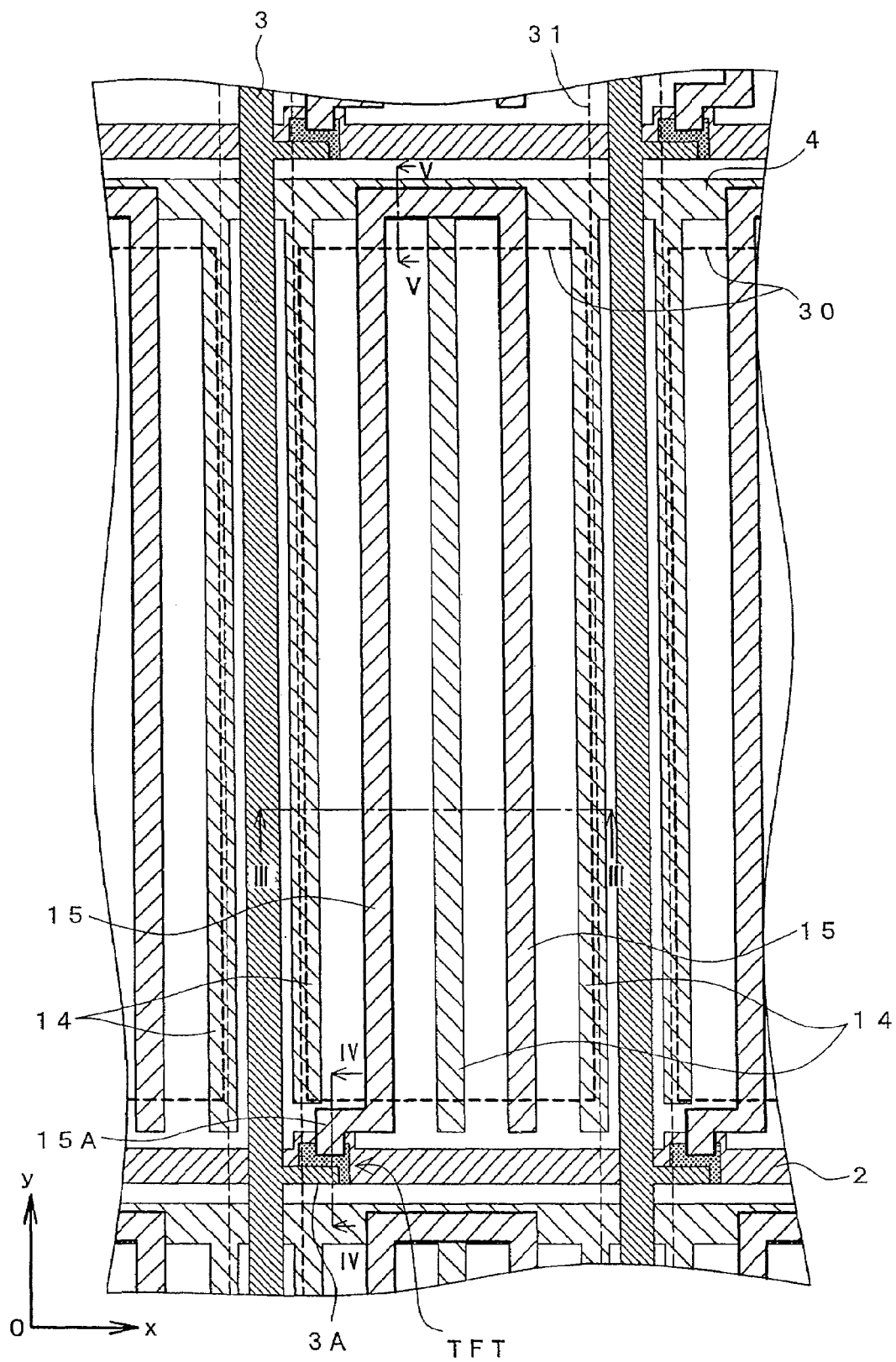
FIG. 1 is a plan view of Embodiment 1 of this invention.
Figure 3:
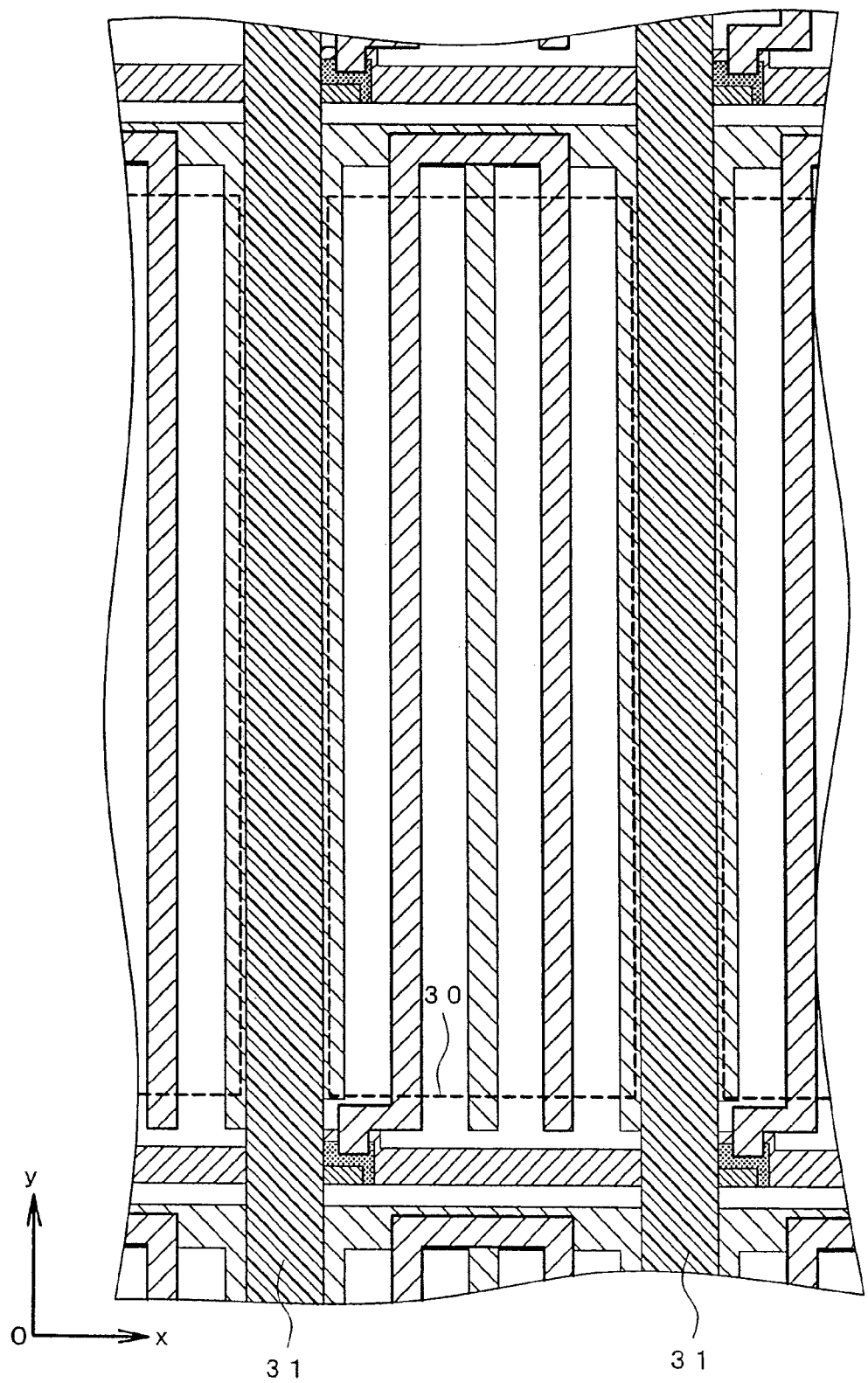
FIG. 3 is a plan view showing the positional arrangement of the shield electrode in Embodiment 1.
Figure 4:
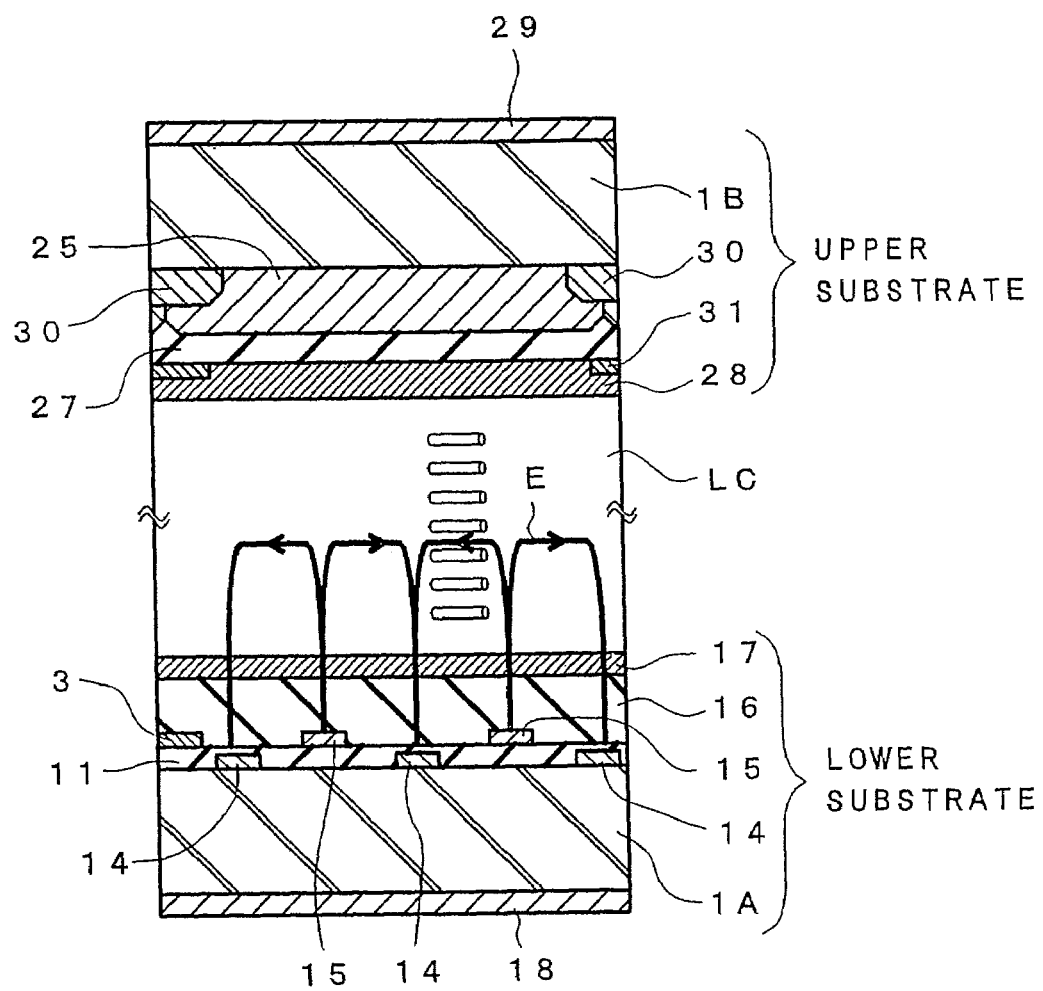
FIG. 4 is a cross section taken along the line III-III of FIG. 1.
Figure 5:
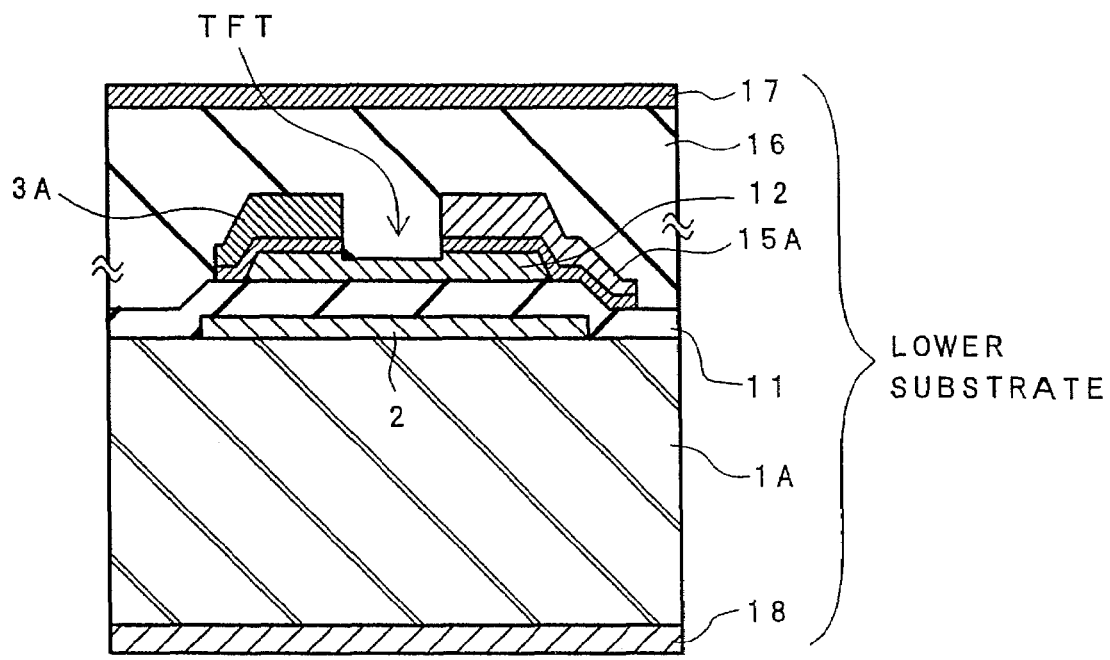
FIG. 5 is a cross section taken along the line IV-IV of FIG. 1.
Figure 6:
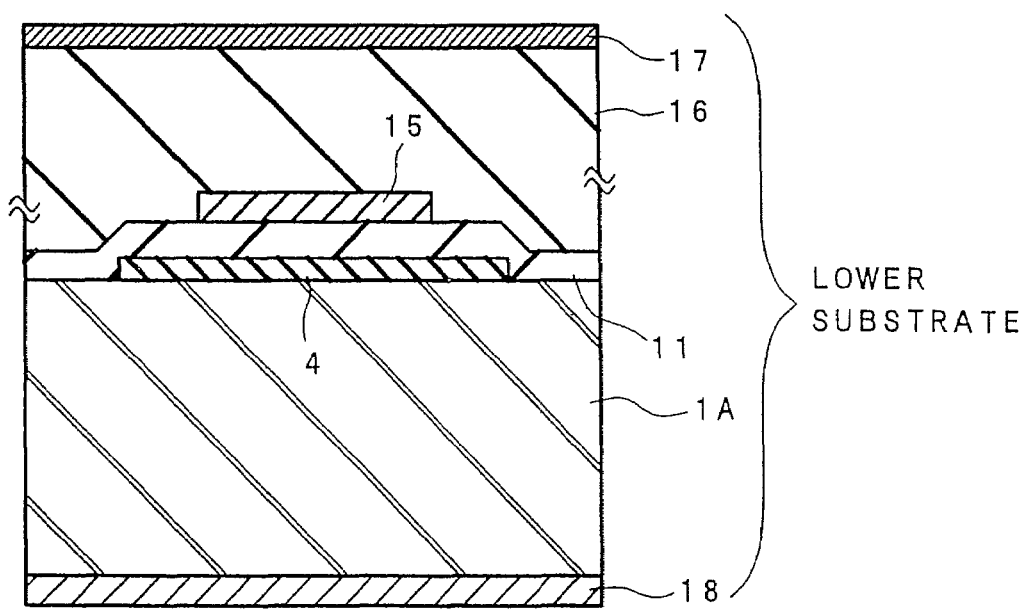
FIG. 6 is a cross section taken along the line V-V of FIG. 1.

FIG. 1 is a plan view showing the detailed configuration of one pixel area in the liquid crystal display device 1. In the figure, solid lines show a structure formed on the transparent substrate 1A and dashed lines show a structure formed on the transparent substrate 1B. The cross section along the line III-III of FIG. 1 is shown in FIG. 4, the cross section along the line IV-IV is shown in FIG. 5 and the cross section along the line V-V is shown in FIG. 6. FIG. 3 is a plan view showing the arrangement of the shield electrode 31 of FIG. 1.

On the liquid crystal layer side of the transparent substrate 1A, the scan signal line 2 made of aluminum Al for example is formed to extend in the x direction, and the reference signal line 4 made of aluminum Al for example is formed close to a scan signal line 2 in an adjacent pixel area in the (+) direction.

The scan signal line 2 is spaced a great distance from the reference signal line 4 in the (−) y direction. The pixel area is defined by the scan signal line 2 and the reference signal line 4 and also by the video signal line 3, as described earlier.

In each pixel area three reference electrodes 14 are formed integrally with the reference signal line 4. Of these reference electrodes 14, two are arranged adjacent to the video signal lines 3, and extend from the reference signal line 4 in the (−) y direction. Another reference signal line 4 extends from the reference signal line 4 in the (−) y direction, dividing the pixel area along the center line. All the three reference electrodes 14 are spaced from the scan signal line 2 which is provided on the (−) y direction side of the reference signal line 4.

Over the surface of the transparent substrate 1A where the scan signal line 2 is formed, an insulating film 11 (see FIGS. 4, 5 and 6) of a silicon nitride film, for example, is formed covering the scan signal line 2, the reference signal line 4 and the reference electrodes 14. The insulating film 11 serves as an interlayer insulating film between the video signal line 3 and the scan signal line 2 and between the video signal line 3 and the reference signal line 4, as a gate insulating film in a region where a thin film transistor TFT is formed, and as a dielectric film in a region where the storage capacitor Cstg is formed.

Over the surface of the insulating film 11 a semiconductor layer 12 is formed in the thin film transistor TFT forming region. The semiconductor layer 12 is made, for example, of amorphous silicon and is formed to overlap the scan signal line 2 at a location close to the video signal line 3. In this structure a part of the scan signal line 2 serves as a gate electrode of the thin film transistor TFT.

Over the surface of the insulating film 11 are formed video signal lines 3 adjacently arranged and extending in the y direction, which lines are made in the form of a multilayer structure of, say, chromium and aluminum. A part of the video signal line 3 is extended and formed integrally with a drain electrode 3A formed over a part of the semiconductor layer 12.

Further, a display electrode 15 is formed over the surface of the insulating film 11 in the pixel area and is U-shaped to divide one pixel area in three. One end of the display electrode 15 is formed integrally with a source electrode 15A of the thin film transistor TFT, and the electrode extends in the (+) y direction, then in the (+) x direction over the reference signal line 4 and then in the (−) y direction.

In this case, the part of the display electrode 15 formed over the reference signal line 4 constitutes a storage capacitor Cstg having the insulating film 11 as a dielectric film. The storage capacitor Cstg produces an effect of holding the video information in the display electrode 15 for a long period after the thin film transistor TFT has been turned off.

The interface between the semiconductor layer 12 and the drain and source electrodes 3A, 15A of the thin film transistor TFT is doped with phosphorus (P) and is a high concentration layer through which ohmic contacts with these electrodes are made. This construction can be obtained by forming the high concentration layer over the entire surface of the semiconductor layer 12, forming the drain and source electrodes, and etching the high concentration layer other than on the electrode-formed regions with the electrodes being used as a mask.

Over the insulating film 11 over which the thin film transistor TFT, the video signal line 3 and storage capacitor Cstg are formed, a passivation film 16 of, for example, silicon nitride (see FIGS. 4, 5 and 6) is formed. Over the passivation film 16 there is formed an alignment layer 17. This structure as a whole constitutes a so-called lower substrate of the liquid crystal display device. The lower substrate is provided with a polarizing plate 18 on the side opposite to the liquid crystal layer.

A light shielding film 30 is formed on the liquid crystal side of the transparent substrate 1B to serve as what is generally called an upper substrate, which is shown by dotted lines in FIG. 1. The light shielding film 30 is made of an organic resin in which, e.g., black pigment is dispersed. Further, as shown by dashed lines in FIG. 1, a shield electrode 31 is so formed as to completely be superimposed over the video signal line 3 in plan view. That is, as shown in FIG. 3, the shield electrode 31 covers the video signal line 3 completely. The shield electrode 31 is made of, for example, ITO (indium-tin-oxide) that forms a so-called transparent electrode. In this case, because the shield electrode has no light shielding effect, it is desirable that its boundary be located inside the boundary of the light shielding film 30 as shown in FIG. 1. It is of course possible to form the shield electrode 31 out of a metallic material, for example, chromium Cr.

As described above, the object of providing the shield electrode 31 is to terminate undesired electric lines of force coming out of the video signal line 3 at the shield electrode 31 to prevent the electric field between the display electrode 15 and the reference electrodes 14 from fluctuating depending on the video signal and thereby to minimize the vertical smear.

Figure 8:
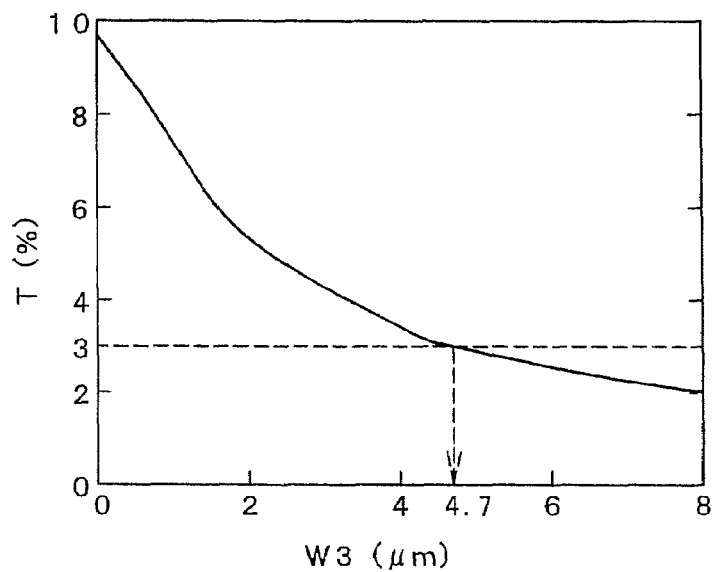
FIG. 8 is a graph showing the relation between the width of the shield electrode and the vertical smear.

FIG. 8 shows experimental data representing the relation between the width of the shield electrode 31 covering the video signal line 3 entirely and the intensity of the vertical smear. In the figure, W3 is defined as follows.

$$W3=(W2-W1)/2$$

where W1 is the width of the video signal line 3 and W2 is the width of the shield electrode 31.

It has been empirically known that when the vertical smear intensity T is less than 3%, the vertical smear cannot be recognized visually. Therefore, from the above data, it is preferable that the width of W3 be set at 4.7 µm or larger. This means that the vertical smear can be eliminated by setting the width of the shield electrode 31 to be more than 9.4 µm greater than the width of the video signal line 3.

Further, because on the lower substrate 1A the reference electrodes 14 are formed on both sides of the video signal line when seen in plan view, this arrangement of the reference electrodes 14 combined with the action of the shield electrode can minimize the electric field of the video signal line more effectively.

The shield electrode 31 provided on the upper substrate 1B can reduce the parasitic capacitance between the video signal line 3 and the shield electrode 31 much more than when it is provided on the lower substrate 1A. This in turn reduces the power consumption more than when the shield electrode 31 is provided on the lower substrate 1A and also leads to size reduction of the video signal drive circuit.

FIG. 4 is a cross section taken along the line III-II of FIG. 1.

In the figure, when a voltage is applied between the reference electrodes 14 and the display electrode 15 formed on the transparent substrate 1A (lower substrate), an electric field E is produced in the liquid crystal layer LC in a direction almost parallel to the transparent substrate 1A.

In FIG. 4, though the horizontal distance between the display electrode 15 and the reference electrodes 14 is apparently smaller than the thickness of the liquid crystal layer LC in plan view, the actual horizontal distance between the display electrode 15 and the reference electrodes 14 is much larger than the thickness of the liquid crystal layer LC and thus the electric field E produced is almost parallel to the transparent substrate.

The shield electrode 31 on the transparent substrate 1B side is formed over the surface of a planarization film 27 covering a color filter 25 formed on the surface of the transparent substrate 1B, in such a way that the shield electrode 31 overlaps the video signal line 3 and is disposed inside the region of the light shielding film 30. An alignment layer 28 is formed over the surface of the shield electrode 31. A polarizing plate 29 is disposed on the surface of the transparent substrate 1B on the side opposite to the liquid crystal.

Figure 7:
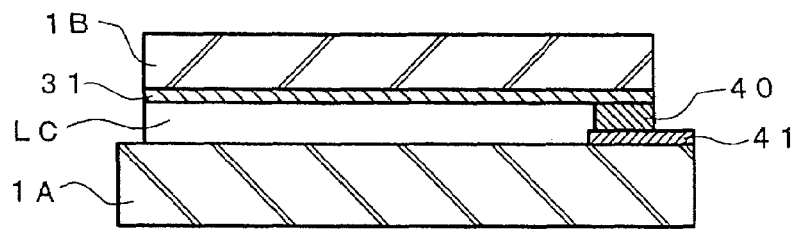
FIG. 7 is a side sectional view showing the method of making an electrical connection of the shield electrode in the liquid crystal display device of Embodiment 1.

FIG. 7 is a schematic cross section showing the construction of the liquid crystal display device 1 for connecting the shield electrode 31 to the LCD driver power circuit 7. The shield electrode 31 formed on the upper substrate 1B is connected through a conductive layer 40 to a shield electrode connecting terminal 41 provided on the lower substrate 1A. The conductive layer 40 may be made of a sealant material in which conductive beads are dispersed and electrically interconnects the shield electrode 31 and the shield electrode connecting terminal 41. The material of the conductive layer 40 is not limited thereto and may be any of conductive materials such as silver paste.

The shield electrode connecting terminal 41 and the LCD driver power circuit 7 are electrically connected by, e.g., an independent wiring. It is also possible, however, to use at least one line of the video signal lines 3 as a dedicated line for electrical connection between the shield electrode connecting terminal 41 and the LCD driver power circuit 7, and to electrically connect it to the LCD driver power circuit 7 when connecting the video signal line 3 and the video signal drive circuit 6. Alternatively, it impossible to use at least one line of the scan signal lines 2 outside the display area as a dedicated line for electrical connection between the shield electrode connecting terminal 41 and the LCD driver power circuit 7, and to electrically connect it to the LCD driver power circuit 7 when connecting the scan signal line 2 and the vertical scanning circuit 5.

Figure 9:
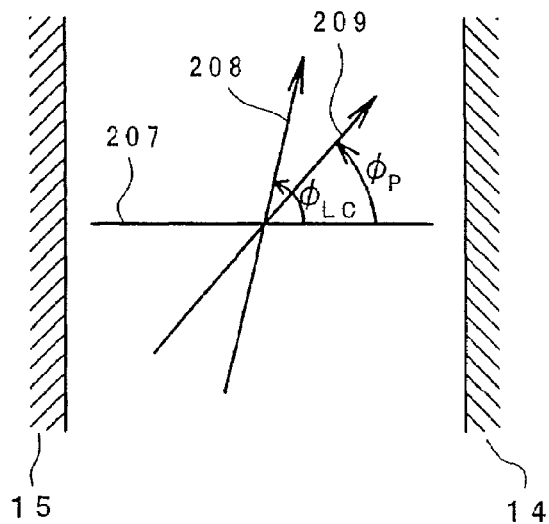
FIG. 9 is a vector diagram showing the relation between the alignment layer and the polarizer plate in the liquid crystal display device of Embodiment 1.

Next, the relation between the alignment layer 17 and the polarizing plate 18 arranged on the transparent substrate 1A and the relation between the alignment layer 28 and the polarizing plate 29 formed on the transparent substrate 1B will be described, referring to FIG. 9.

The angle $\phi$LC of the rubbing directions 208 of the alignment layers 17, 18 are both 85 degrees with respect to the direction 207 of the electric field applied between the display electrode 15 and the reference electrodes 14. The polarizing plate 18 has a polarized light transmitting axis 209 at an angle $\phi$P, which is equal to $\phi$LC. The other polarizing plate 29 has a polarized light transmitting axis perpendicular to 209. The liquid crystal layer LC uses a nematic liquid crystal material having a positive dielectric constant anisotropy $\Delta\in$ of 7.3 (1 kHz) and a refractive index anisotropy $\Delta$n of 0.073 (589 nm, 20° C.).

With this arrangement, generating an electric field parallel to the transparent substrate 1A in the liquid crystal layer LC makes it possible to modulate light passing through the liquid crystal layer LC.

As long as a construction is employed in which the light passing through the liquid crystal layer can be modulated by a in-plane field, it is obvious that there are no restrictions on the structure of the alignment layer and polarizing plate or the material of the liquid crystal.

Embodiment 2

A second embodiment will be described centering on its differences from Embodiment 1.

Figure 14:
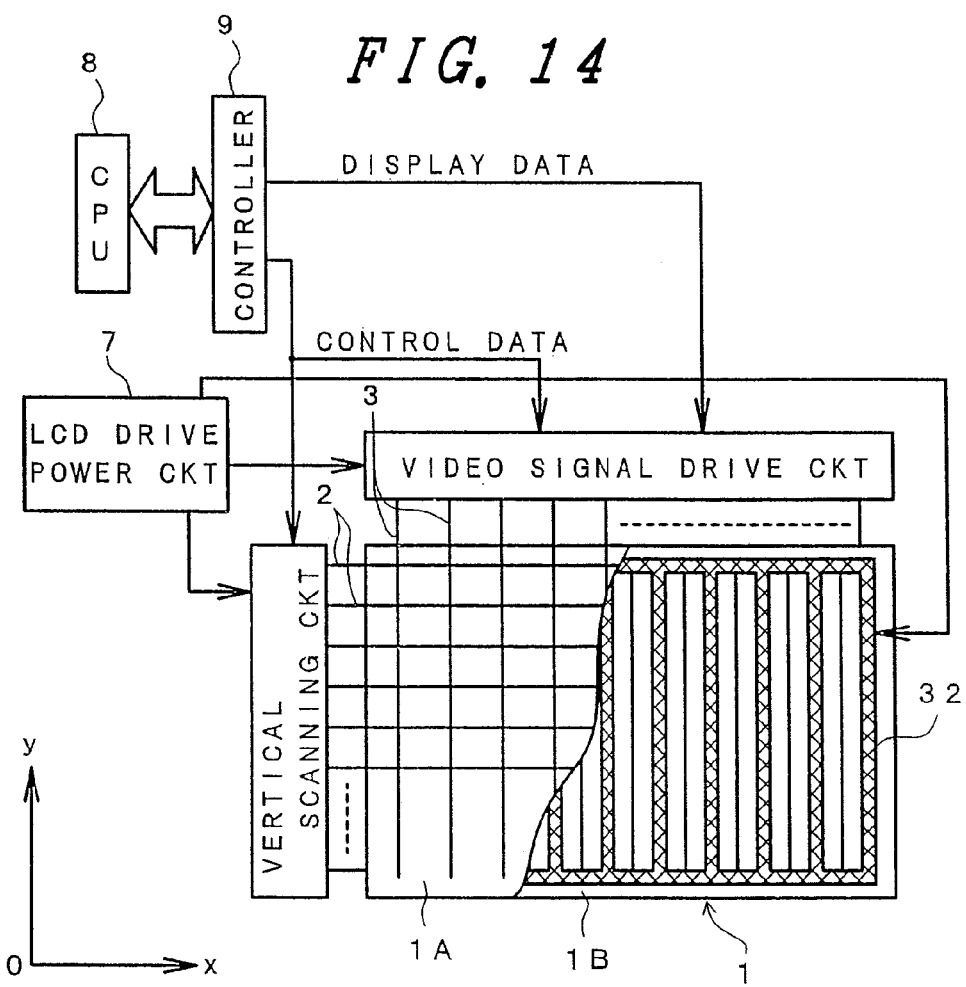
FIG. 14 is a schematic diagram showing the configuration of the liquid crystal display device of Embodiment 2 and its peripheral circuits.

FIG. 14 is a schematic diagram corresponding to FIG. 2. what differs from the configuration of FIG. 2 is, first, that the reference signal lines 4 and the reference electrodes 14 are not formed on the lower substrate 1B. Hence, instead of the storage capacitor Cstg used in Embodiment 1, an additional capacitor Cadd is provided in each pixel (These are not shown).

Figure 11:
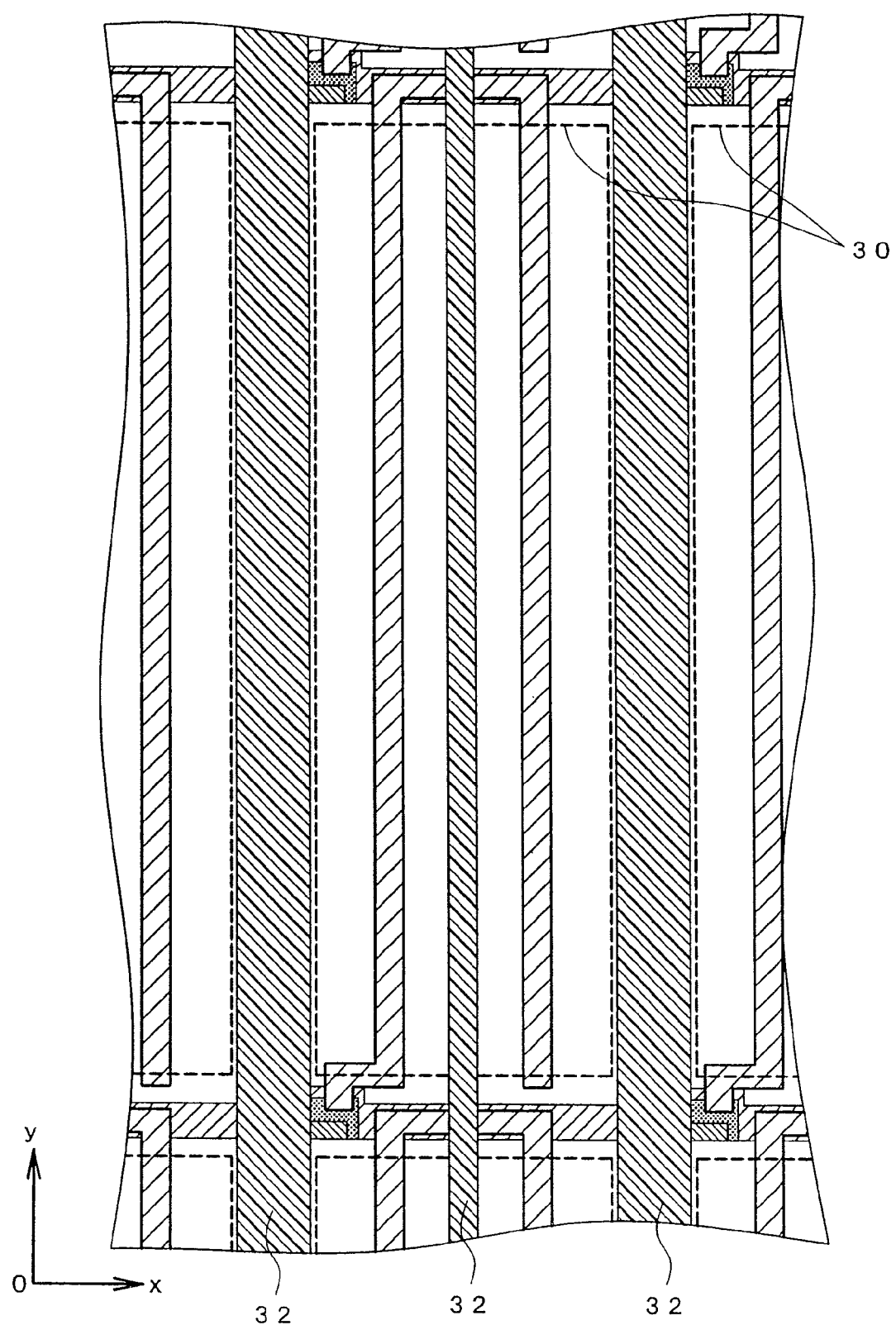
FIG. 11 is a plan view showing the arrangement of the shield electrode that also serves as the reference electrode in Embodiment 2.

On the transparent substrate 1B on the liquid crystal layer side, a shield electrode 32 that also serves as the reference electrodes 14 are formed to overlap the video signal lines 3 extending in the y direction in the figure and adjacently arranged in the x direction. The shield electrode 32 that also serves as the reference electrodes 14 are also arranged at the center of the pixel area, extending in the Y direction. The plan view arrangement of the shield electrode 32 functioning also as the reference electrodes is shown in FIG. 11 that corresponds to FIG. 3.

The voltage applied to the shield electrode 32 that also serves as the reference electrodes 14 is supplied from the LCD driver power circuit 7. This voltage is the same as that applied to the reference signal line 4 of Embodiment 1.

Figure 10:
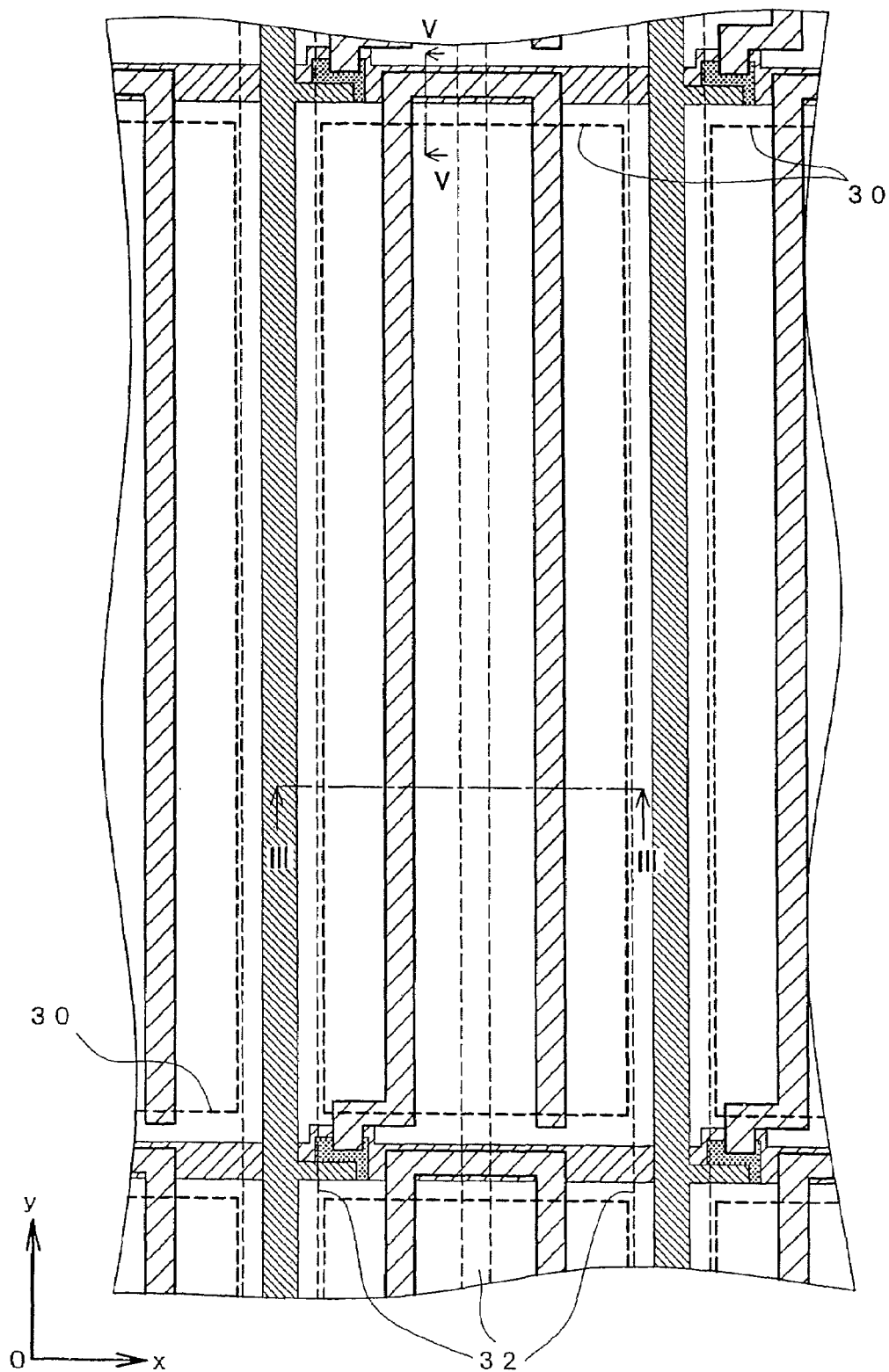
FIG. 10 is a plan view of Embodiment 2 of this invention.
Figure 13:
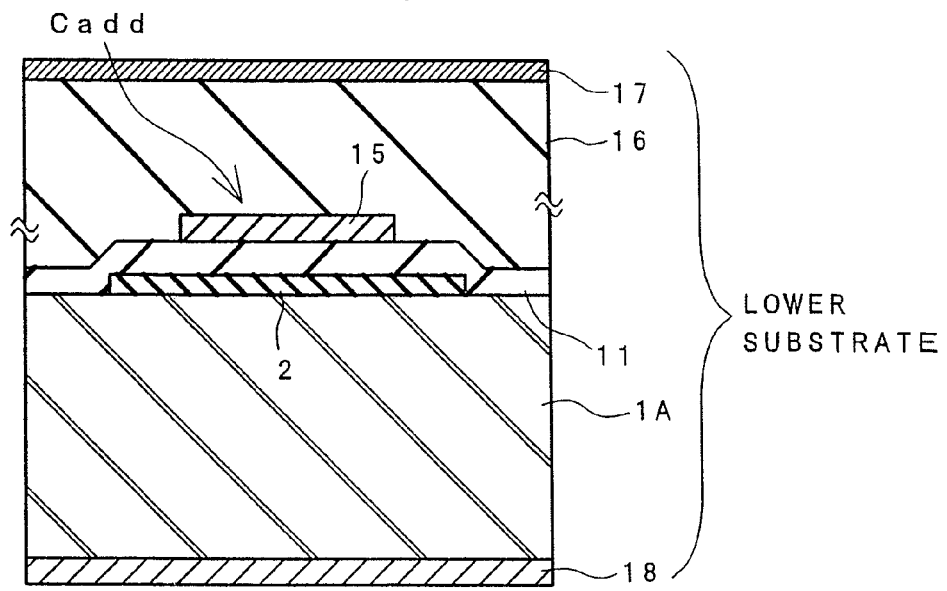
FIG. 13 is a cross section taken along the line V-V of FIG. 10.

FIG. 10 is a plan view showing the detailed construction of a pixel area corresponding to FIG. 1. A cross section corresponding to FIG. 4 is shown in FIG. 2 and a cross section of a region of the additional capacitor Cadd corresponding to FIG. 6 is shown in FIG. 13.

In these figures, on the surface of the transparent substrate 1A on the liquid crystal layer side scan signal lines 2 made of, for example, aluminum Al are formed to extend in the x direction. Over the surface of the transparent substrate 1A over which the scan signal lines 2 are formed an insulating film 11 (see FIGS. 12 and 13) of, say, silicon nitride is formed to cover the scan signal lines 2. This insulating film 11 functions as an interlayer insulation film between the video signal lines 3 and the scan signal lines 2, as a gate insulating film in the thin film transistor TFT forming regions, and as a dielectric film in the additional capacitor Cadd forming regions.

Display electrodes 15 are formed over the surface of the insulating film 11 in the pixel areas. Each of the display electrodes 15 is U-shaped, to divide one pixel area into, e.g., three parts. That is, one end of the display electrode 15 is formed integrally with the source electrode 15A of the thin film transistor TFT, and the electrode extends in the y direction, then extends in the (+) x direction over the scan signal line 2 of an adjoining pixel on the (+) y direction side, and then extends in the (−) y direction.

In this configuration, the part of the display electrode 15 formed over the scan signal line 2 constitutes the additional capacitor Cadd having the insulating film 11 as a dielectric film. This additional capacitor Cadd provides an effect of holding video information in the display electrode 15 for a long time after the thin film transistor TFT has been turned off.

Over a part of the transparent substrate 1B or the upper substrate on the liquid crystal side a light shielding film 30 is formed as shown by dashed lines in FIG. 10. The light shielding film 30 may be formed of an organic resin in which, for example, black pigment is dispersed. As shown by dashed lines in FIG. 10, shield electrode 32 that also serves as the reference electrodes 14 is formed to completely to overlap the video signal lines 3 in plan view. Further, in this embodiment, the shield electrode 32 that also serves as the reference electrodes 14 also extends through the center of each pixel area in the y direction. Here, the shield electrode 32 also serving as the reference electrodes 14 is formed of ITO in order to eliminate the need to form the reference signal lines on the lower substrate 1A and thereby to use the area thus saved as the aperture area, improving the aperture ratio. This advantage is obtained in addition to the advantage of Embodiment 1.

Figure 12:
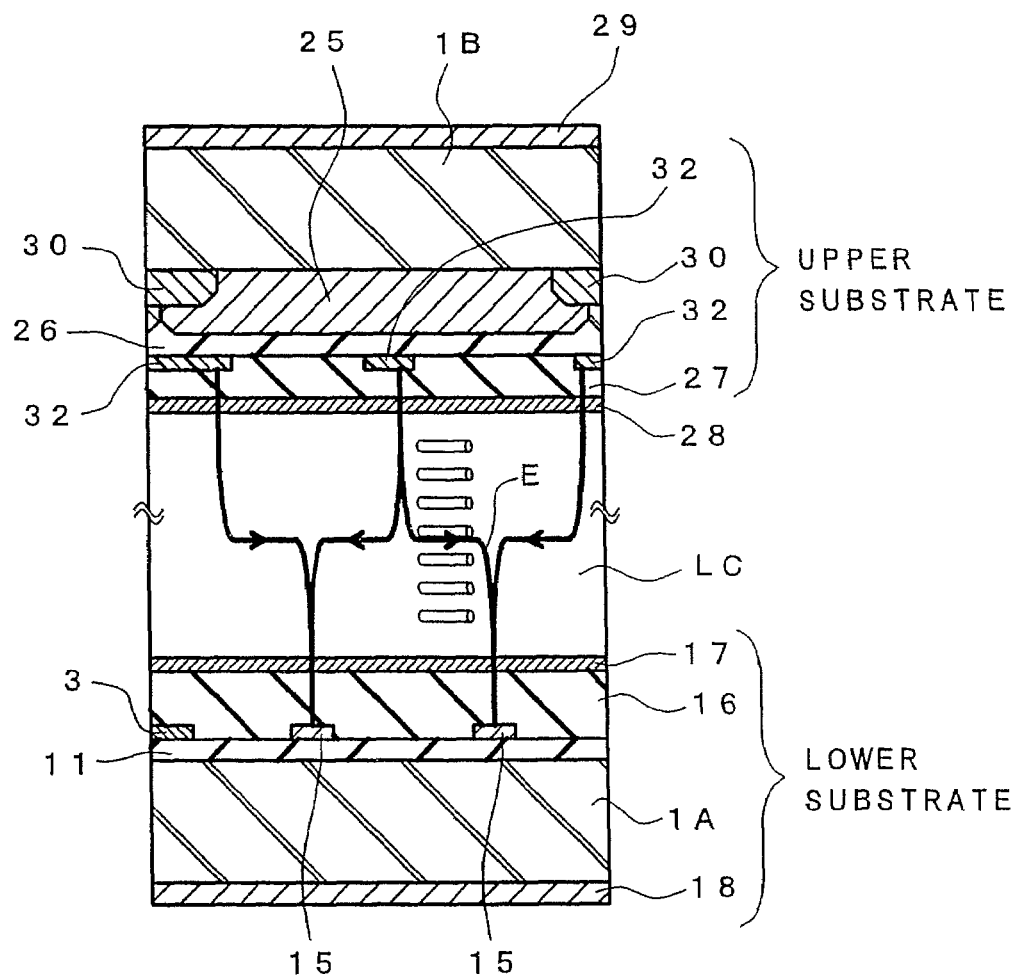
FIG. 12 is a cross section taken along the line III-III of FIG. 10.

FIG. 12 is a cross section corresponding to FIG. 4. In the figure, a voltage is applied between the display electrodes 15 formed on the transparent substrate 1A (lower substrate) and the shield electrode 32 formed on the transparent substrate 1B (upper substrate) and having the function of the reference electrodes 14 to produce an electric field E extending through the liquid crystal layer LC parallel to the transparent substrate 1A. Although in FIG. 12, the horizontal distance between the display electrode 15 and the shield electrode 32 serving as the reference electrode is apparently smaller than the thickness of the liquid crystal layer LC, it is noted, however, that the actual distance is much larger than the thickness of the liquid crystal layer LC. Hence, the electric field E generated extends parallelly to the transparent substrate.

The shield electrode 32 on the transparent substrate 1B that also serves as the reference electrodes is formed over a planarization film 26 that covers a color filter 25 formed on the surface of the transparent substrate 1B in such a way that the shield electrode 32 is superimposed over the video signal lines and disposed inside the area of the light shielding layer. In this embodiment, the shield electrode 32 also extends through the center of each pixel area in the y direction. Over the shield electrode 32 that also serves as the reference electrodes 14 there is formed a planarization film 27, over which an alignment layer 28 is formed. On the surface of the transparent substrate 1B opposite to the liquid crystal side there is provided a polarizing plate 29.

As long as a configuration is employed in which the light passing through the liquid crystal layer can be modulated by an in-plane field, it is obvious that there are no restrictions on the structure of the alignment layer and polarizing plate and the materials such as that of the liquid crystal.

Embodiment 3

In the third embodiment, the shield electrode 32 that also serves as the reference electrodes 14 is made of a metal such as Cr.

The disadvantage of Embodiment 2 is that because the shield electrode 32 serving also as the reference electrodes 14 is made of ITO, the part of the shield electrode 32 extending through the center of each pixel area does not block light but transmits it, deteriorating the contrast. If a light shielding layer is provided over the part of the shield electrode 32 at the center of the pixel, a deteriorated contrast can be avoided, but other problems arise including degraded aperture ratio and reduction in margin for the alignment between the upper and lower substrates.

Hence, the shield electrode 32 serving also as the reference electrodes 14 are made of a metallic material, so that the part of the shield electrode 32 at the center of the pixel has a light blocking capability and thus can improve the contrast without obviating the advantages of Embodiment 2 such as reduced vertical smear and improved aperture ratio.

Embodiment 4

This embodiment will be described centering on its differences from Embodiment 1.

Figure 17:
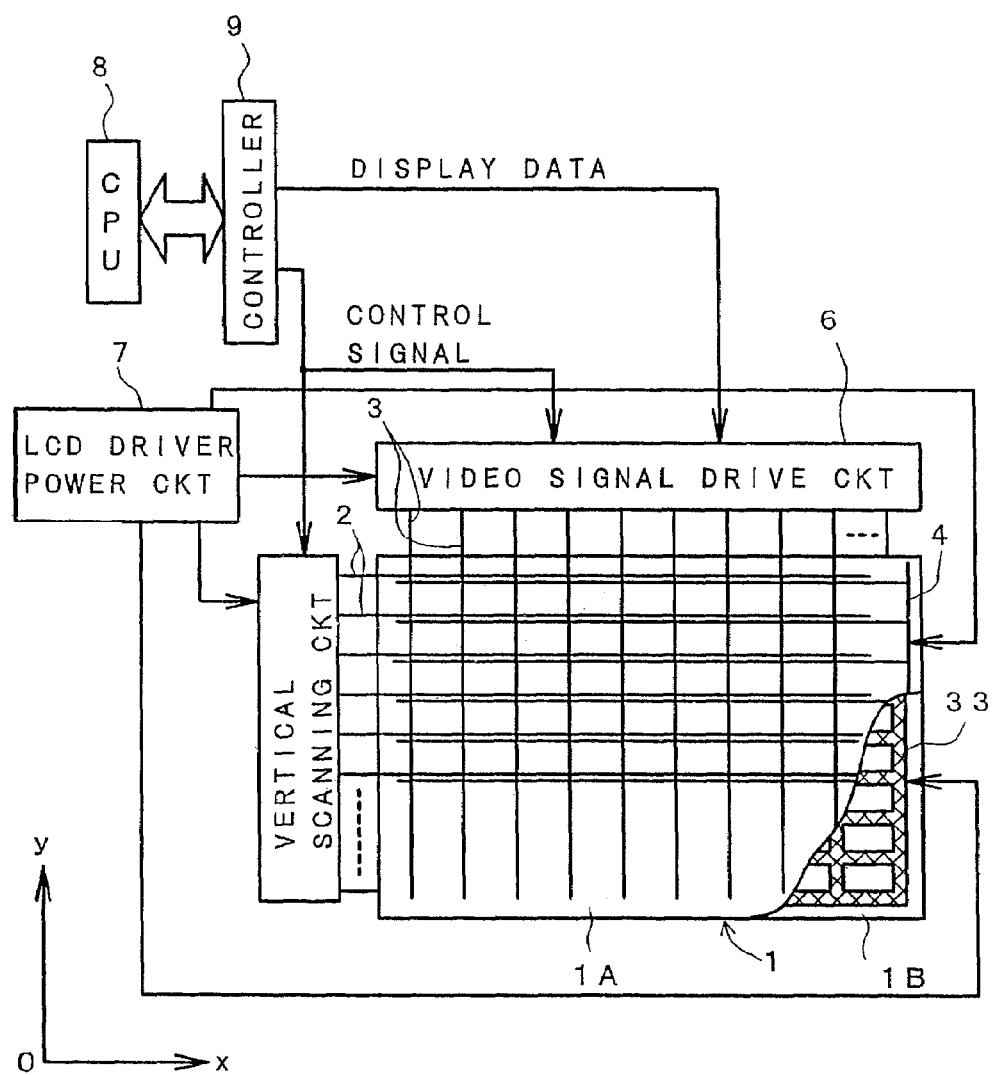
FIG. 17 is a schematic diagram showing the configuration of the liquid crystal display device of Embodiment 4 and its peripheral circuits.

FIG. 17 illustrates the configuration of the liquid crystal display device and its peripheral circuits. In the figure, a shield electrode 33 that also serves as the light shielding film 30 is formed in a matrix form over the surface of the transparent substrate 1B—which constitutes the liquid crystal display device 1—on the liquid crystal layer side in such a way that the shield electrode 33 overlaps the video signal lines 3 and the scan signal lines 2. The shield electrode 33 with the function of the light shielding film 30 is required to have both conductivity and a light blocking capability. In this embodiment, the shield electrode 33 is made of a metal such as Cr, for example. The shield electrode 33 is electrically connected to the LCD driver power circuit 7 in a way similar to that in which the shield electrode 31 in Embodiment 1 is connected.

Figure 15:
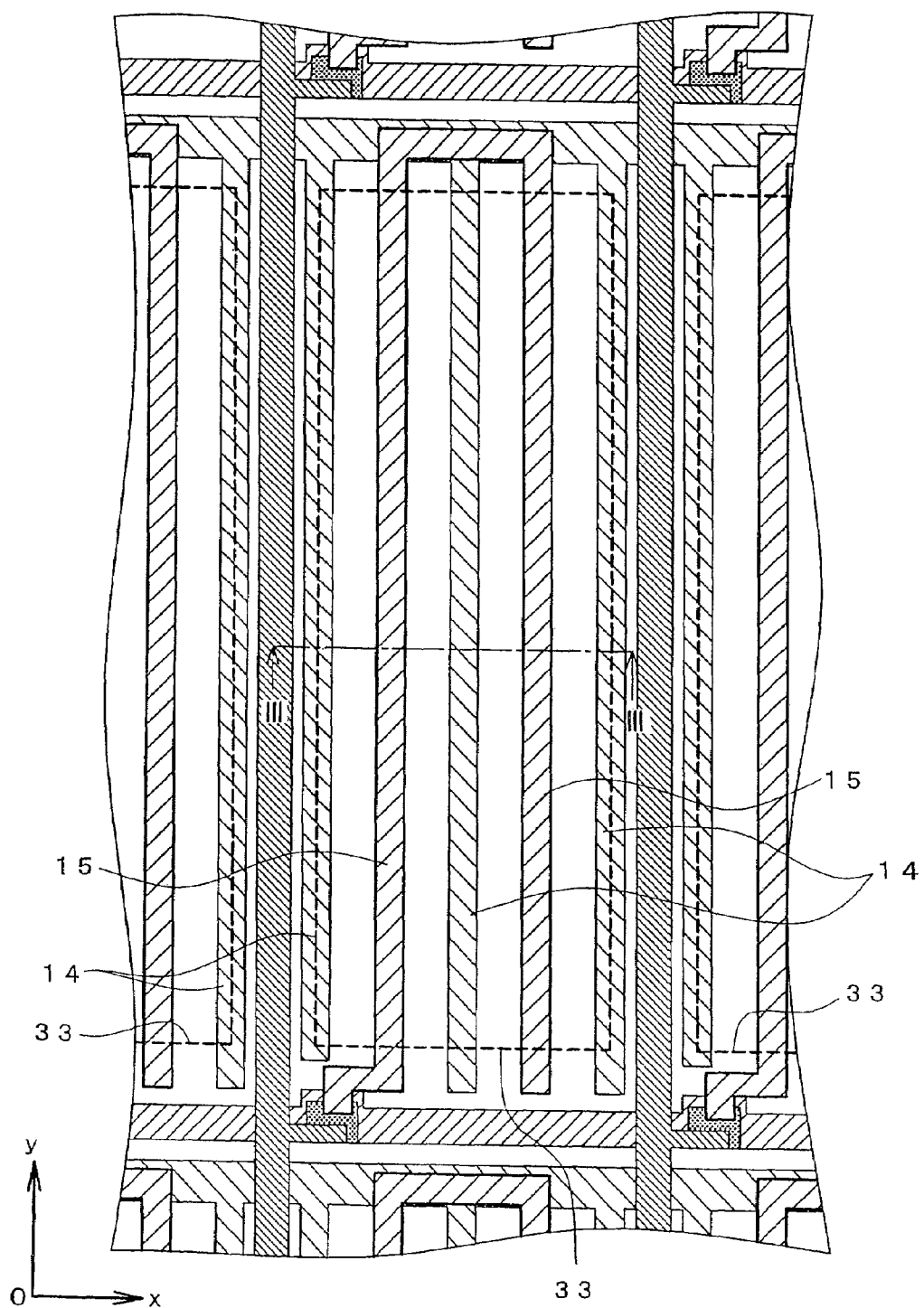
FIG. 15 is a plan view of Embodiment 4.

FIG. 15 is a plan view showing the detailed configuration of one pixel area. In the figure, solid lines show the construction formed on the transparent substrate 1A side and dashed lines show the construction formed on the transparent substrate 1B side. The top view pattern of the shield electrode 33 serving also as the light shielding film 30 in this embodiment is shaped in a matrix form in each pixel and is almost similar to the top view pattern of the light shielding film 30 of Embodiment 1. In other words, the shield electrode 33 serving also as the light shielding layer is the light shielding layer 30 serving also as the shield electrode.

Figure 16:
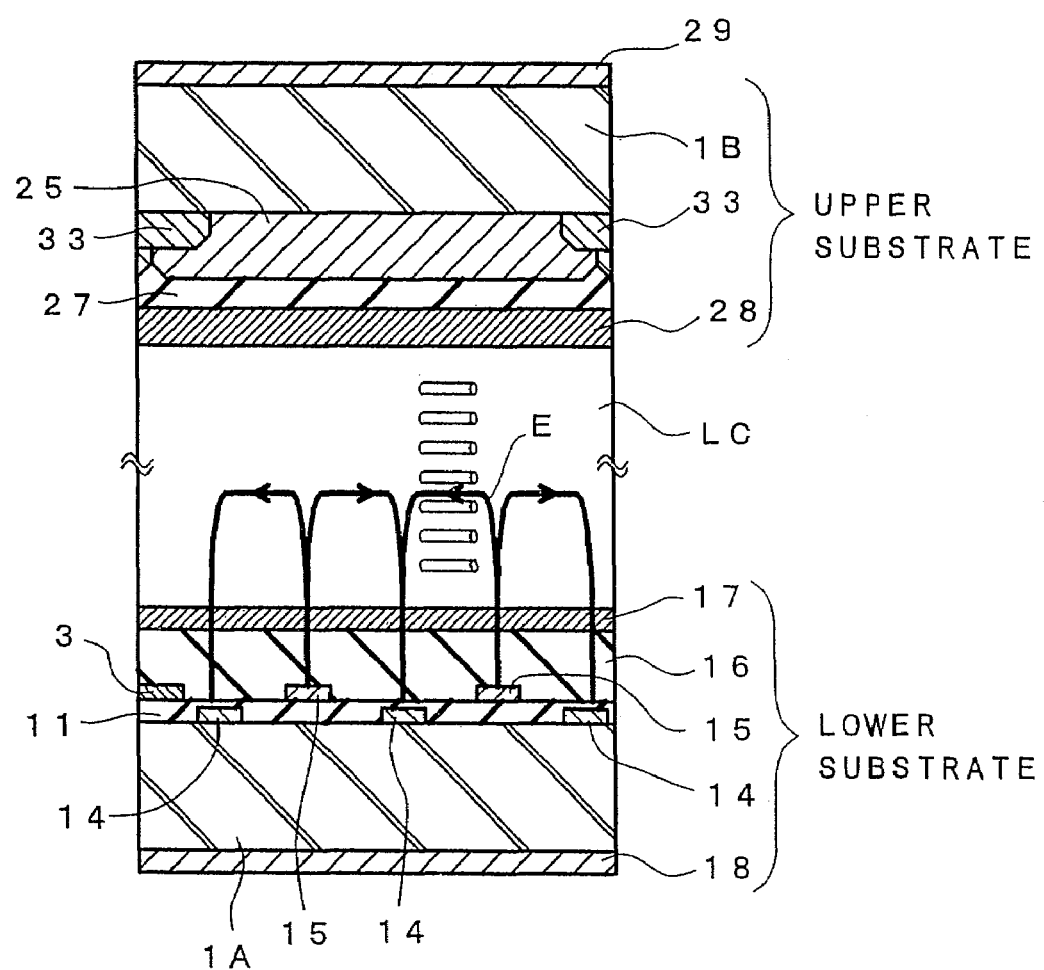
FIG. 16 is a cross section taken along the line III-III of FIG. 15.

FIG. 16 shows a cross-sectional structure of one pixel. On the transparent substrate 1B there is formed the shield electrode 33 serving also as the light shielding layer, over which a color filter 25 and then a planarization film 27 are formed, followed by the deposition of an alignment layer 28.

In this embodiment, the shield electrode 33 t at also serves as the light shielding film 30 eliminates the need to form the light shielding film 30 and the shield electrode 33 separately, offering the advantage of improved productivity in addition to the advantage of Embodiment 1.

Embodiment 5

Figure 18:
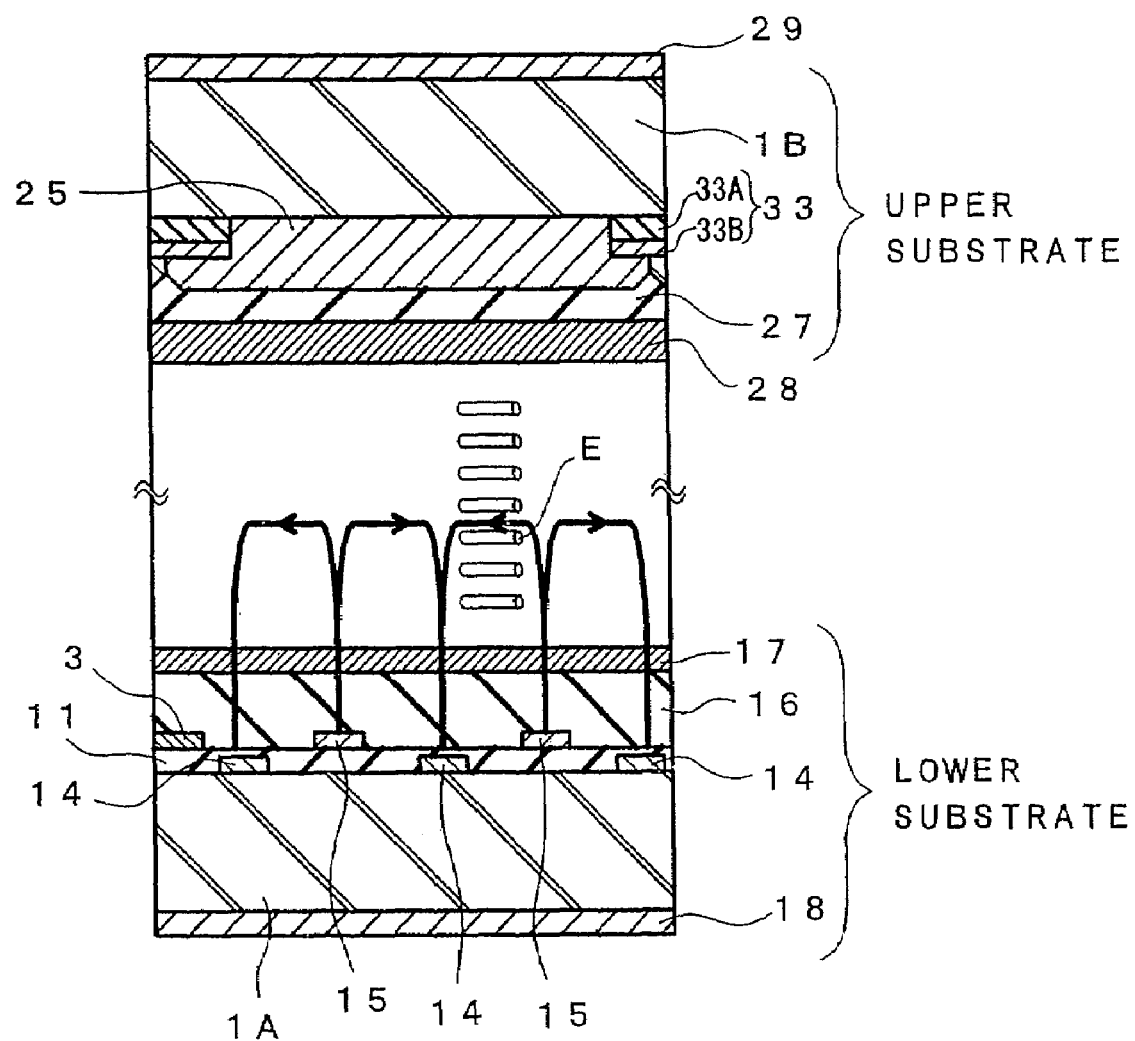
FIG. 18 is a cross section of Embodiment 5.

The only difference between this embodiment and Embodiment 4 is the construction of the shield electrode 33 that also serves as the light shielding layer. In this embodiment the shield electrode 33 serving also as the light shielding layer has a two-layer structure. FIG. 18 illustrates a cross-sectional structure of a pixel. The shield electrode 33 serving also as the light shielding layer has two layers: a Cr layer 33A and an ITO layer 33B. Thus, in FIG. 7, when the shield electrode 33 that also serves as the light shielding layer is provided instead of the shield electrode 31, the conductive layer 40 is directly in contact with the ITO layer 33B of the shield electrode 33 in the region where the shield electrode also serving as the light shielding layer is in contact with the conductive layer 40. The ITO layer 33B made of an oxide is known to exhibit better characteristics than metallic materials in terms of long-term reliability of connection with different materials. By forming the Cr layer 33A and the ITO layer 33B integrally, it is possible to form the two-layer shield electrode 33 serving as the light shielding layer without increasing the photographic process.

Therefore, this embodiment can offer the advantage of being able to increase the long-term reliability of the shield electrode 33 also serving as the light shielding layer in addition to the advantages of Embodiment 4.

Embodiment 6

In this embodiment, the light shielding layer that also serves as the shield electrode of Embodiment 5 is formed as an ITO single layer at the electric connection section of Embodiment 5. Because the terminal portion is formed as the single ITO layer with an excellent long-term reliability, the electrical connection is further improved compared with Embodiment 5 in terms of long-term reliability.

Embodiment 7

The following description will center on the difference from Embodiment 2.

Figure 19:
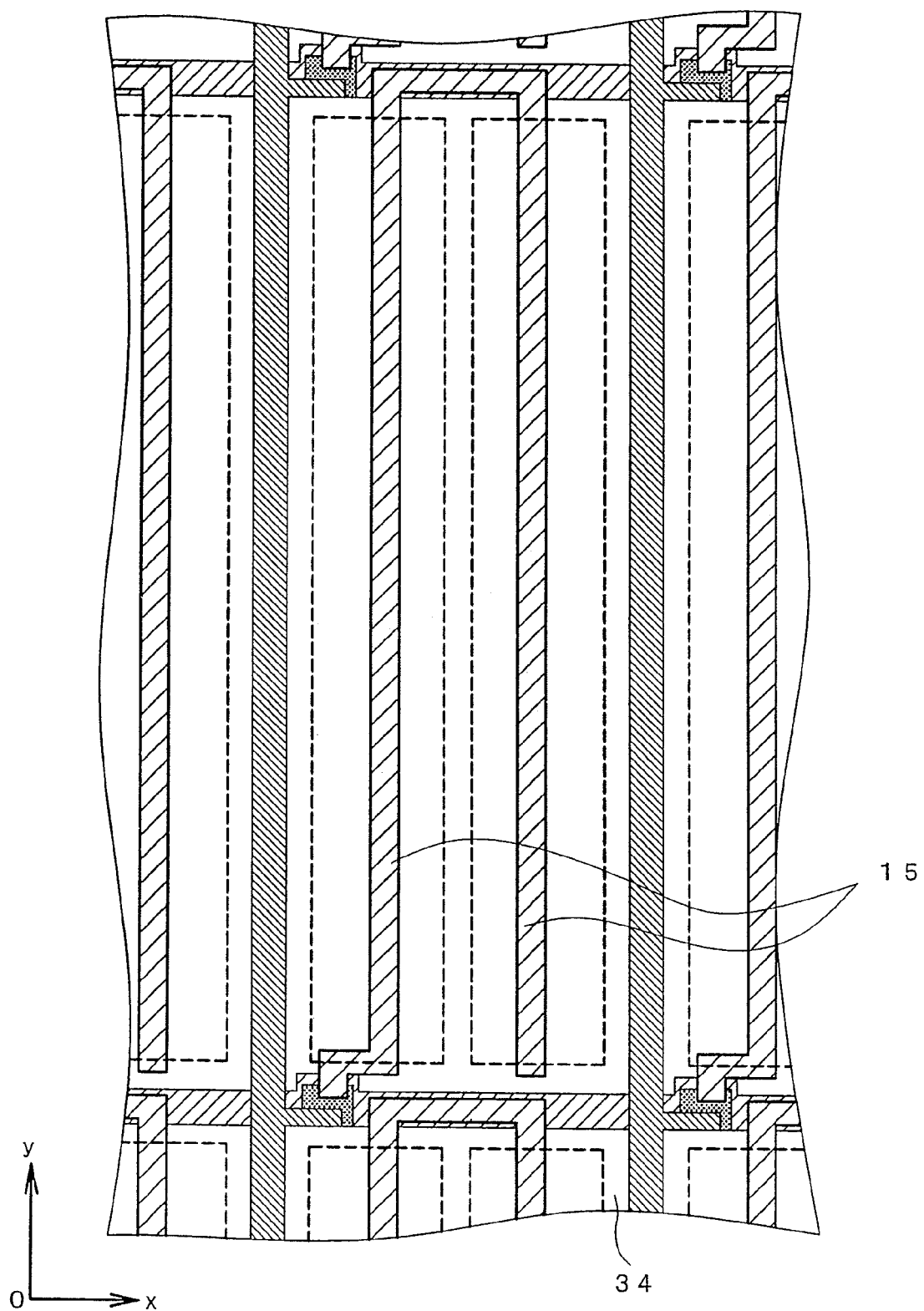
FIG. 19 is a plan view of Embodiment 7.

FIG. 19 shows the detailed configuration of one pixel area. What differs from the configuration of FIG. 10 is that, instead of the light shielding film 30 and the shield electrode 32 also serving as the reference electrodes, a shield electrode 34 that also serves as the light shielding layer and the reference electrodes is provided on the upper substrate 1B.

Figure 20:
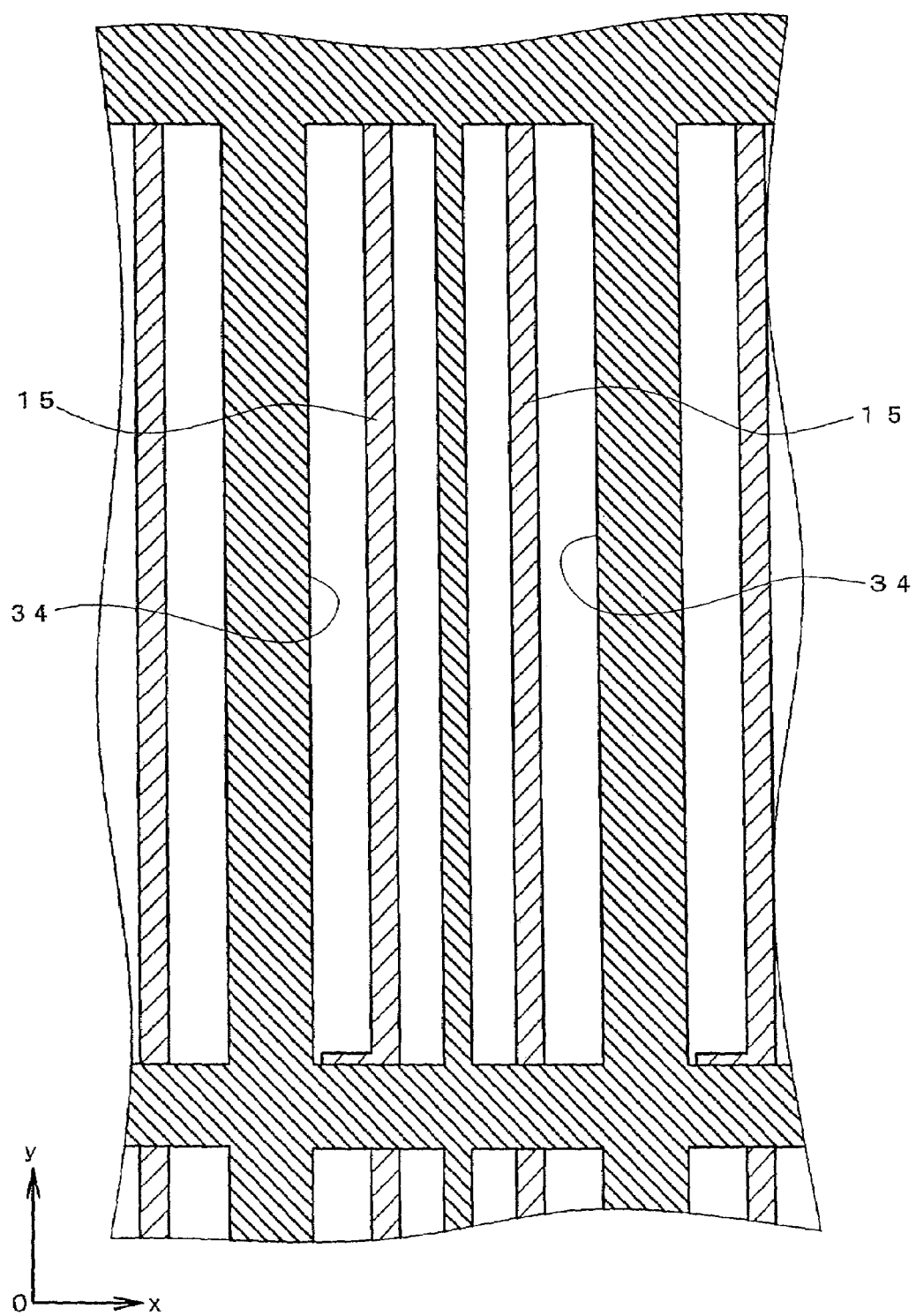
FIG. 20 is a plan view showing the positional arrangement of the shield electrode that also serves as the reference electrode and a light shielding layer in Embodiment 7.

FIG. 20 is a plan view showing the positional relation between the shield electrode 34 on the substrate 1B and various wirings on the substrate 1A. Because the shield electrode 34 also serving as the reference electrodes and the light shielding layer has functions of the light shielding film 30 and the shield electrode 32 also serving as the reference electrodes in the embodiment 2 of FIG. 10, the shield electrode 34 has a superposed shape of the light shielding film 30 and the shield electrode 32.

Figure 21:
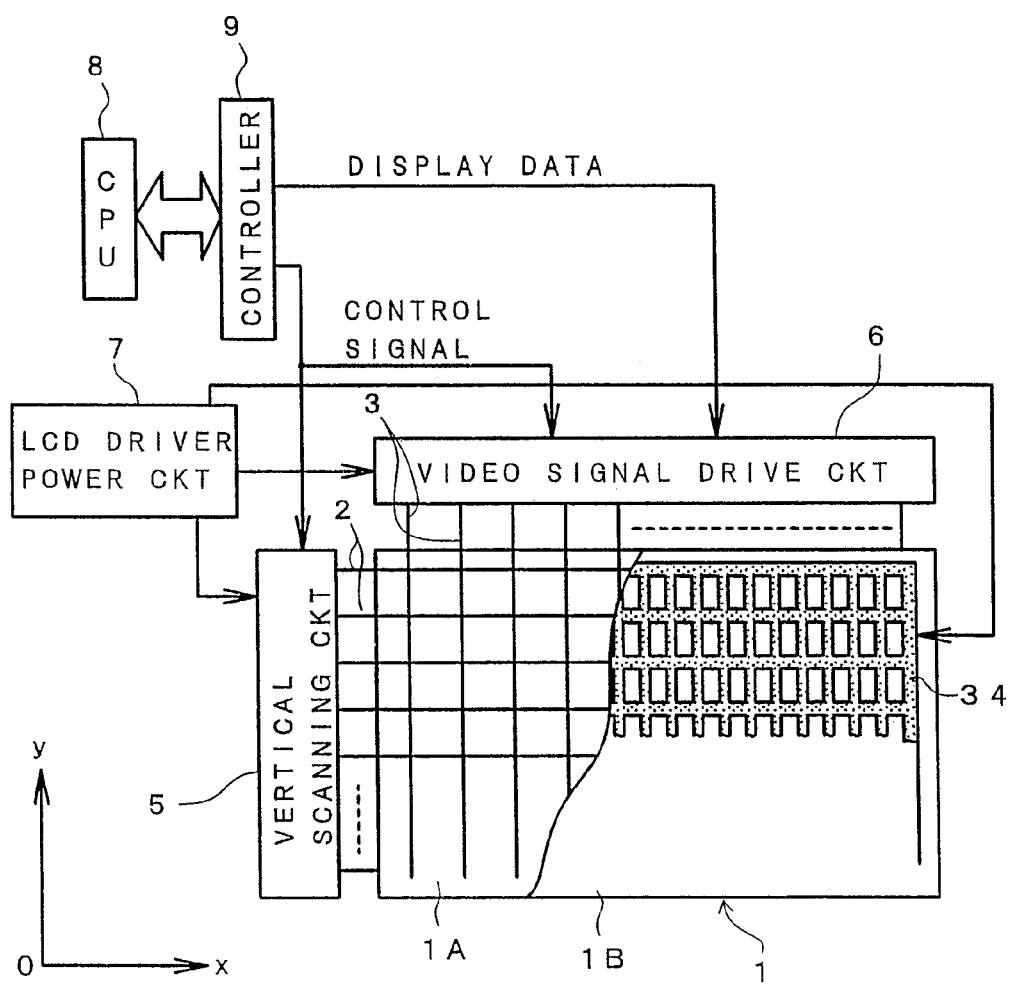
FIG. 21 is a schematic diagram showing the configuration of the liquid crystal display device of Embodiment 7 and its peripheral circuits.

FIG. 21 shows the configuration of the liquid crystal display device and its peripheral circuits.

The shield electrode 34 that also serves as the reference electrodes and the light shielding layer is supplied with a reference potential (voltage) from the LCD driver power circuit 7. In this embodiment, to reduce the dielectric strength of the video signal drive circuit 6, the reference potential (voltage) is used is an AC voltage.

Figure 22:
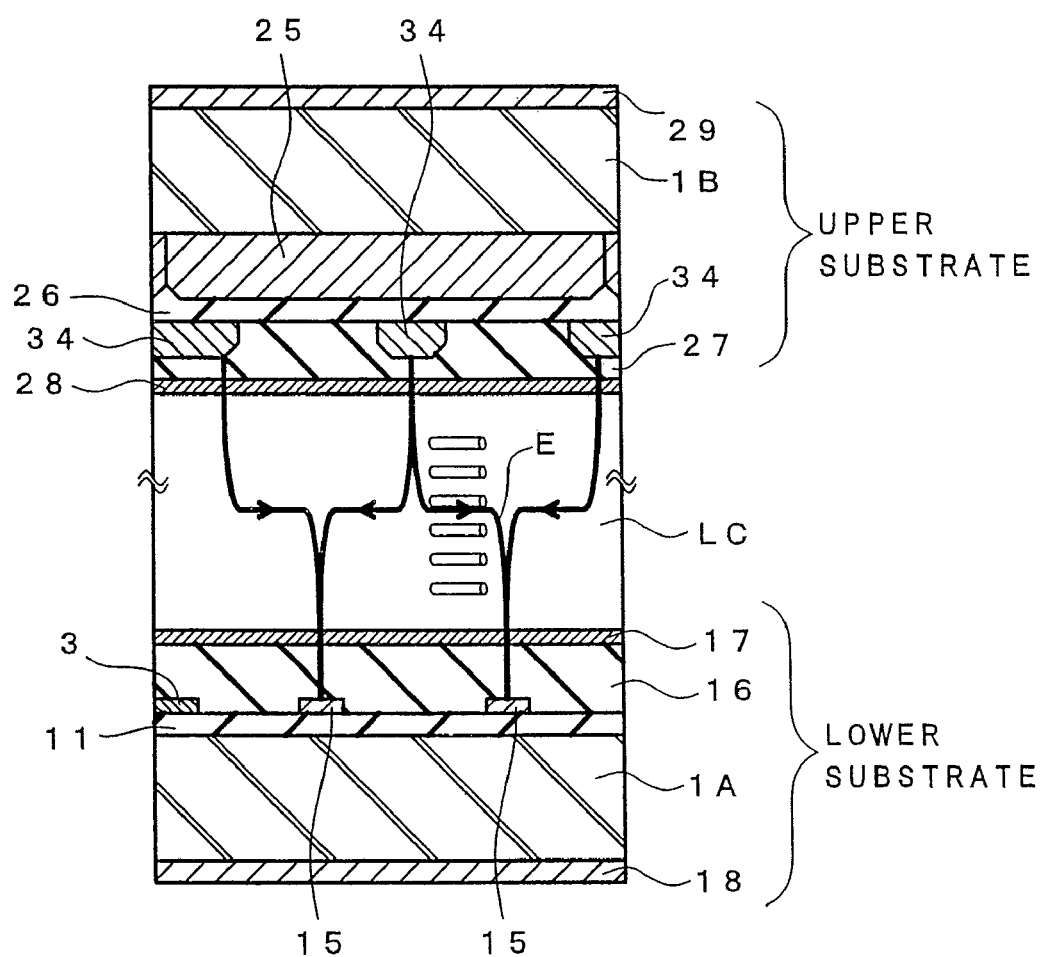
FIG. 22 is a cross section of Embodiment 7.

FIG. 22 shows the cross-sectional structure of a pixel. In this embodiment, the functions of the two layers—the light shielding film 30 of FIG. 12 and the shield electrode 32 also serving as the reference electrodes —are achieved by a single layer of the shield electrode 34 that also serves as the reference electrodes and the light shielding film.

The shield electrode 34 that also serves as the reference electrodes and the light shielding layer is required to have both a light shielding capability and a conductivity. Hence, in this embodiment, the shield electrode 34 is formed of a metal such as chromium Cr.

In this embodiment, the construction of the upper substrate 1B is made simpler than that of Embodiment 2, which realizes a reduced cost compared with Embodiment 2 and an improved productivity.

The shield electrode 34 functioning also as the reference electrodes and the light shielding layer is shaped like a matrix with openings only at pixel areas. The fact that the shield electrode 34 also serves as the reference electrodes and the reference signal line means that the reference electrodes and the reference signal line are formed in a relatively large area. Hence, a voltage is applied to the shield electrode 34 that also serves as the reference electrode and the light shielding layer in each pixel area through a low resistance, so that the reference signal waveform can be prevented from becoming dull, minimizing the so-called brightness gradient and horizontal smear.

Embodiment 8

The following description will center on the difference from Embodiment 7.

Figure 23:
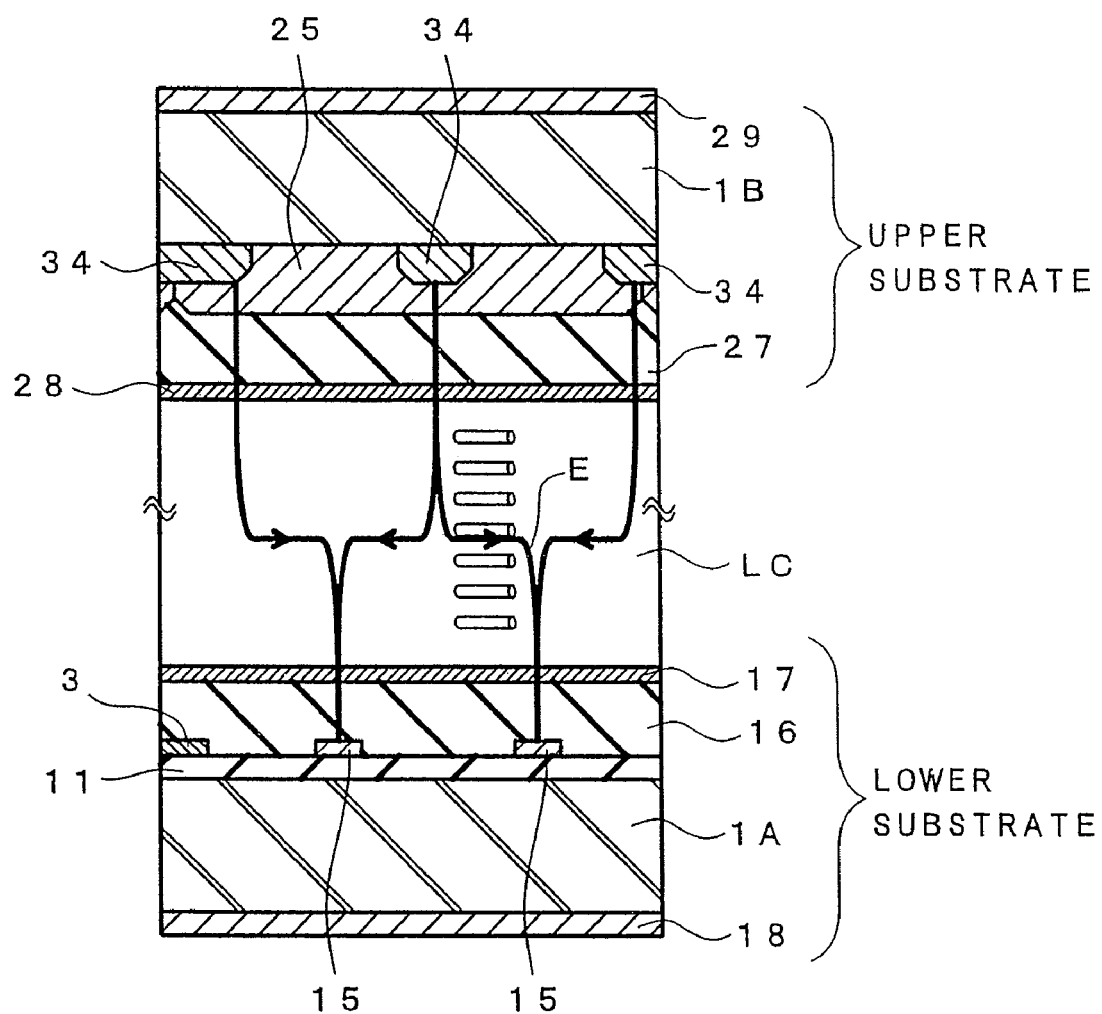
FIG. 23 is a cross section of Embodiment 8.

FIG. 23 shows a cross section of one pixel. What differs from the construction of FIG. 22 is the shield electrode 34 that also serves as the reference electrodes and the light shielding layer. That is, on the surface of the transparent substrate 1B on the liquid crystal side is formed the shield electrode 34 also serving as the reference electrodes and the light shielding layer, over which a color filter 25, a planarization film 27 and an alignment layer 28 are formed in order.

The shield electrode 34 that also serves as the reference electrodes and the light shielding layer uses such a material as chromium Cr.

This construction obviates the planarization film 26 of FIG. 22, realizing an improved productivity and a reduced cost when compared with Embodiment 7.

In Embodiment 7 the shield electrode 34 also serving as the reference electrodes and the light shielding layer is formed over the planarization film 26, whereas this embodiment has the shield electrode 34 which also serves as the reference electrodes and the light shielding layer directly formed over the transparent substrate 1B. Considering the planarized surface, the transparent substrate 1B obviously has a better flatness than the planarization film 26 covering the color filter. This means that the structure of FIG. 23 has a lower probability of occurrence of shape defect including wire break parts and damaged parts in the shield electrode 34, which also serves as the reference electrodes and the light shielding layer, than the structure of FIG. 22. This embodiment therefore can reduce the fraction defective compared with Embodiment 7.

Embodiment 9

The following description will center on the difference from Embodiment 8.

Figure 24:
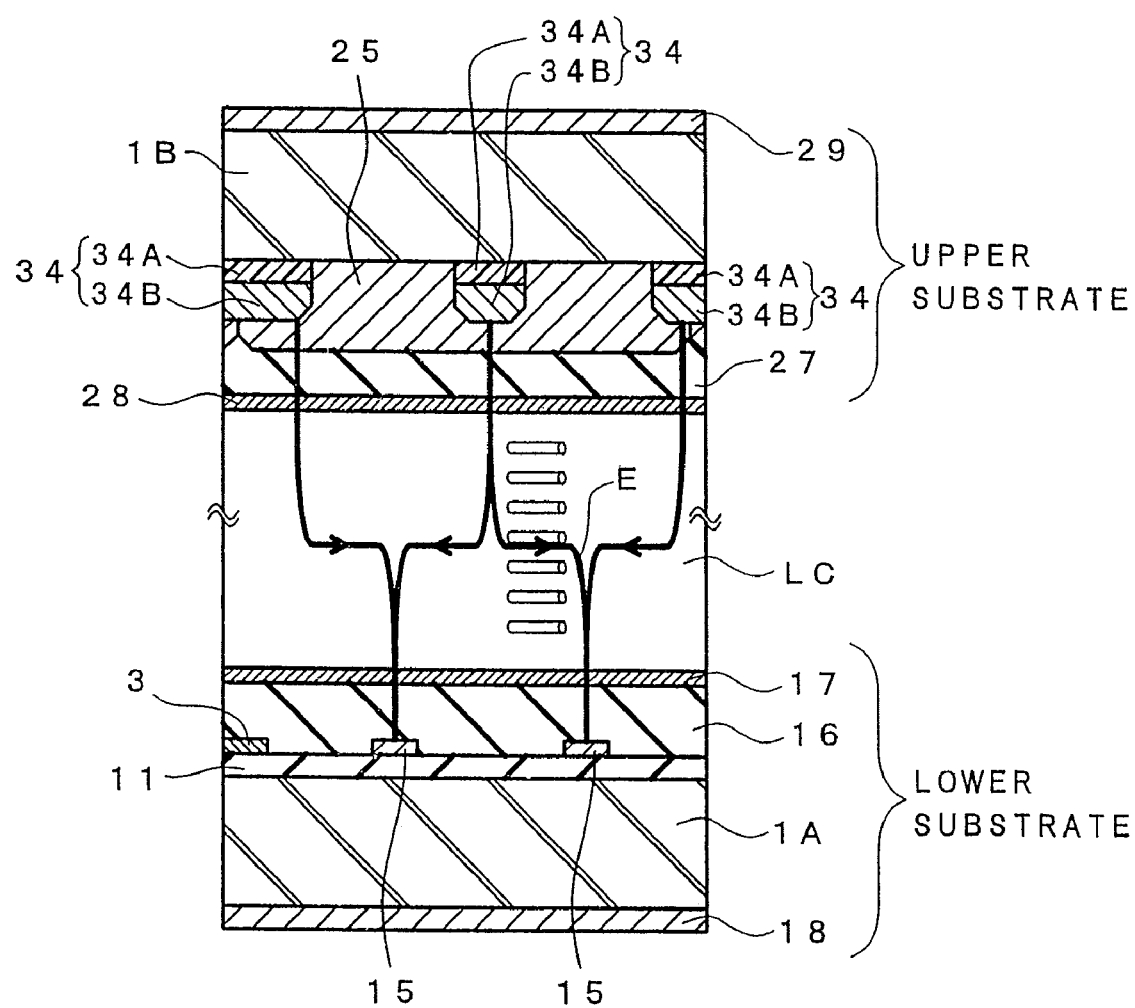
FIG. 24 is a cross section of Embodiment 9.

FIG. 24 shows a cross section of one pixel. What differs from the construction of FIG. 23 is that the shield electrode 34 that also serves as the reference electrodes and the light shielding layer is formed of a multilayer structure of layers 34A and 34B of different materials. That is, the layer 34A formed on the transparent substrate 1B side is made of a material having a low light reflectance and the layer 34B on the liquid crystal layer LC side is made of a material having a high conductivity.

The material of the layer 34A with a low reflectance may be chosen from organic materials containing carbon and the material of the layer 34B with a high conductivity from metals such as Cr.

A so-called backlight as a source of light passing through the liquid crystal layer LC is provided behind the transparent substrate 1A (lower substrate).

In the liquid crystal display device with the above configuration, when the display surface is observed through the transparent substrate 1B (upper substrate), the reflection of light from the shield electrode 34 that also serves as the reference electrodes and the light shielding layer can be reduced significantly. When compared with Embodiment 8, it is found that this embodiment can reduce the light reflectance for the shield electrode 34, which is about 30% in Embodiment 8, down to about 1%. This embodiment therefore can form a clear display picture.

In the embodiment structured as described above, the multilayer shield electrode 34 having the functions of the reference electrodes and the light shielding layer comprises a material layer 34A on the transparent substrate 1B side made of a material with a low light reflectance and a material layer 34B on the liquid crystal layer LC side made of a material with a high conductivity.

It is easily understood that on condition that the backlight is provided behind the transparent substrate 1B, a similar effect can be achieved even if the multilayer relation is reversed.

In the embodiment described above, an organic material containing carbon is used for the material layer with a low light reflectance. It is easily understood that other materials may be used, such as organic materials where pigment is dispersed or organic materials where metallic material is dispersed, to produce a similar effect. When an organic material in which a metallic material is dispersed is used, a plurality of different metallic materials may be combined as the material to be dispersed in the organic material. This can planarize the absorption wavelength, offering the advantage of being able to prevent reflected light from being colored.

For the material layer made of a material with a low light reflectance, it is possible to use a metal such as molybdenum Mo. Although it does not reduce the reflectance so much compared with the above embodiment, the use of molybdenum improves the reliability in the manufacture of the multilayer structure.

That is, the material layer containing carbon as a main component not only has various limitations on its manufacturing method but other problems, such as a relative difficulty in forming the material layer flatly and a risk of breaking a high conductivity overlying layer. These problems are eliminated by the material layer.

Forming both layers out of metals offers the advantage that if one of the layers is broken, the other layer will compensate for the break.

The use of a metal oxide with a low reflectance, such as CrO not only improves the reliability of the manufacture of the multilayer structure but also reduces the reflectance.

Embodiment 10

FIG. 21 is a schematic diagram showing one embodiment of the liquid crystal display device of this invention comprising a liquid crystal display unit and peripheral circuits.

In the figure, the liquid crystal display unit 1 has as its enclosure a transparent substrate 1A and a transparent substrate 1B with a liquid crystal layer interposed therebetween. On the surface of the transparent substrate 1A, which is a lower substrate, on the liquid crystal layer side, scan signal lines 2 extend in the x direction in the figure and are arranged to be parallel in the y direction. Insulated from these signal lines 2, video signal lines 3 are formed to extend in the y direction and are arranged to be parallel in the x direction.

Relatively large rectangular areas enclosed by the scan signal lines 2 and the video signal lines 3 constitute pixel areas, which are arranged in a matrix arrangement to form a display unit. In each pixel area a display electrode is formed and a thin film transistor TFT and an additional capacitor Cadd are arranged in a part of the periphery of the pixel area. (None of these is shown.)

On the surface of the transparent substrate 1B on the liquid crystal layer side there is formed a light shielding layer 34 which is conductive and has a surface reflectance of less than 10% on the display surface aide. The light shielding layer 34 terminates the electric field from the video signal lines 3 to reduce a leakage field from the video signal lines 3 into the pixel, thereby minimizing vertical smear caused by such a leakage field.

The liquid crystal display unit 1 has as external circuits a vertical scanning circuit 5 and a video signal drive circuit 6. The vertical scanning circuit 5 supplies a scan signal (voltage) to the scan signal lines 2 successively and, in synchronism with the scan signals, the video signal drive circuit 6 supplies video signals (voltages) to the video signal lines 3.

The vertical scanning circuit 5 and the video signal drive circuit 6 are each supplied with electricity from an LCD driver power circuit 7 and also with display data and a control signal into which image information from a CPU 8 is separated by a controller 9.

The light shielding layer 34 is fed with a reference signal which is also supplied from the LCD driver power circuit 7. While this embodiment uses an AC voltage as a voltage to be applied to the light shielding layer 34, a DC voltage may be used.

FIG. 19 is a plan view showing a detailed configuration of one pixel area of the liquid crystal display unit 1. In the figure, solid lines show the construction formed on the transparent substrate 1A side and dashed lines show the construction formed on the transparent substrate 1B side.

On the surface of the transparent substrate 1A on the liquid crystal layer side the scan signal lines 2 made of, for example, aluminum Al extend in the x direction. Areas enclosed by the scan signal lines 2 and the video signal lines described later constitute pixel areas, as described earlier.

Over the surface of the transparent substrate 1A where the scan signal lines 2 and others are formed, an insulating film 11 of, say, silicon nitride film is formed covering the scan signal lines 2 and the reference electrodes 14. (See FIGS. 5, 13 and 24.) This insulating film 11 functions as an interlayer insulation film between the video signal lines 3 described later and the scan signal lines 2, as a gate insulating film in the thin film transistor TFT forming regions, and as a dielectric film in the additional capacitor Cadd forming regions.

On the surface of the insulating film 11 in the thin film transistor TFT forming regions there is first formed a semiconductor layer 12 which is made of, for example, amorphous silicon and superimposed over a part of the scan signal line 2 close to the video signal line 3. In this structure a part of the scan signal line 2 serves as a gate electrode of the thin film transistor TFT.

Over the surface of the insulating film 11 there are closely arranged video signal lines 3 extending in the y direction which are made in a multilayer structure of, say, chromium and aluminum. A part of the video signal line 3 is extended and formed integrally with a drain electrode 3A formed over a part of the semiconductor layer 12.

Further, a display electrode 15 is formed over the surface of the insulating film 11 in the pixel area and is shaped like a letter U to divide one pixel area into three. One end of the display electrode 15 is formed integrally with a source electrode 15A of the thin film transistor TFT, and the electrode extends in the (+) y direction, then extends over the reference signal line 4 in the (+) x direction, and then extends in the (−) y direction.

In this case, the part of the display electrode 15 formed over the scan signal line 2 constitutes the additional capacitor Cadd having the insulating film 11 as a dielectric film. The additional capacitor Cadd produces an effect of holding the video information in the display electrode 15 for a long time after the thin film transistor TFT has been turned off.

The interface between the semiconductor layer 12 and the drain and source electrodes 3A, 15A of the thin film transistor TFT is doped with phosphorus (P) and is a high concentration layer through which ohmic contacts with these electrodes are made. This construction can be obtained by forming the high concentration layer over the entire surface of the semiconductor layer 12, forming the drain and source electrodes and, using the electrodes as a mask, etching the high concentration layer other than in the electrode-forming regions.

Over the insulating film 11 over which the thin film transistor TFT, the video signal line 3 and the additional capacitor Cadd are formed, a passivation film 16 of, for example, silicon nitride (see FIGS. 5, 13 and 24) is formed. Over the passivation film 16 an alignment layer 17 is formed. This structure as a whole constitutes a so-called lower substrate of the liquid crystal display unit. The lower substrate is provided with a polarizing plate 18 on the side opposite to the liquid crystal layer.

On the surface of the transparent substrate 1B which is an upper substrate, on the liquid crystal layer side, there is formed a light shielding layer 34 shown by dashed lines in FIG. 19, and having a conductivity and a reflectance of less than 10% on the display surface side. The light shielding layer 34 has a multilayer structure of, for example, chromium oxide CrO and chromium Cr formed in this order from the transparent substrate side.

In FIG. 24 when a voltage is applied between the display electrode 15 formed on the transparent substrate 1A (lower substrate) and the light shielding layer 34 formed on the transparent substrate 1B (upper substrate), an electric field E is produced in the liquid crystal layer LC, having a component parallel to the transparent substrate 1A.

Although in FIG. 24 the horizontal distance between the display electrode 15 and the light shielding layer 34 is apparently smaller than the thickness of the liquid crystal layer LC, it is noted, however, that the actual distance is much larger than the thickness of the liquid crystal layer LC. Hence, the electric field E generated has a component parallel to the transparent substrate.

The light shielding layer 34 comprises two layers 34A and 34B stacked on the transparent substrate 1B. In this embodiment the CrO and Cr layers are formed successively over the transparent substrate 1B, and are patterned simultaneously to form layer 34A as a CrO layer with a low reflectance and layer 34B as a conductive Cr layer. A backlight unit is provided on the surface of the transparent substrate 1A on the side opposite to the liquid crystal layer. With this arrangement, the surface of the light shielding layer 34 on the transparent substrate 1B side, i.e., the CrO layer with a low reflectance, is made the display surface, so that external light entering the liquid crystal display unit can be reduced.

Reflection of external light from the liquid crystal display unit is influenced by reflection from the light shielding layer of the transparent substrate 1B and also by reflection from the metallic display electrode, reference electrode and scan electrode of the transparent substrate 1A. In this embodiment, because the role of the reference electrode made of a metal on the transparent substrate 1A in Embodiment 1 is realized by the light shielding layer with a low reflectance, the reflection by the metal electrodes of the transparent substrate 1A can be suppressed.

Because the total number of wires on the transparent substrate 1A can be reduced compared with Embodiment 1, the yield can also be improved.

Further, in this embodiment the light shielding layer 34 also serves both as the reference electrodes and the reference signal lines formed on the transparent substrate 1A in Embodiment 1 and the light shielding layer 34 is formed in a matrix arrangement. This is equivalent to the formation of reference electrodes and the reference signal lines in a relatively large area. Therefore, a voltage is applied to light shielding layer 34 through a low resistance, preventing the reference signal waveform from becoming dull, and thus minimizing the so-called brightness gradient and horizontal smear.

Further, a passivation film 27 is formed over the light shielding layer 34 and the color filter 25 that is formed in a shape having an area covering the light shielding layer 34. Unlike the liquid crystal display unit of the so-called vertical electric field type, the liquid crystal display device of the so-called in-plane field type has no ITO as the reference electrodes that cover the light shielding layer and the color filter. Hence, in the liquid crystal display unit of the in-plane field type, there is a possibility of contamination of the liquid crystal by the light shielding layer and the color filter. The provision of the passivation layer 27, however, prevents the contamination. An alignment layer 28 is formed over the surface of the passivation layer 27. A polarizing plate 29 is provided on the surface of the transparent substrate 1B on the side opposite to the liquid crystal.

Figure 25:
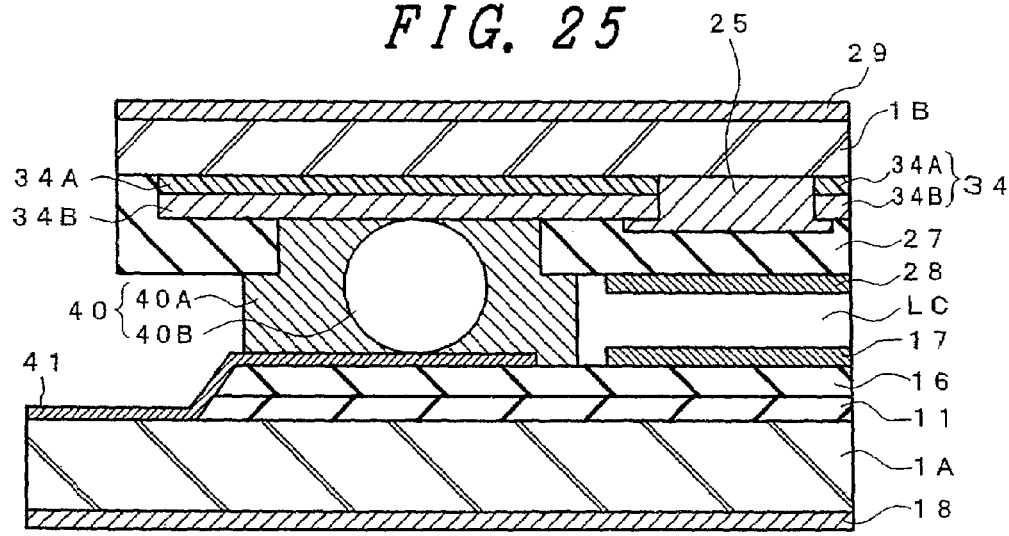
FIG. 25 is a cross section of Embodiment 10.

FIG. 25 schematically shows a cross section of a terminal portion of the liquid crystal display unit 1 for connecting the light shielding layer 34 to the LCD driver power circuit 7. on the lower substrate 1A a connection terminal 41 is formed of ITO. The reason that ITO is used is to improve the reliability. In a region that overlaps the connection terminal when seen in plan view, the light shielding layer 34 on the upper substrate 1B is exposed and connected through the conductive layer 40 to the connection terminal 41 on the lower substrate 1A.

In this embodiment, the conductive layer 40 uses a sealing material where conductive beads are dispersed. In the conductive layer 40, 40A denotes a resin component and 40B denotes the conductive beads. The conductive beads are in contact with the conductive portion 34B of the light shielding layer and with the connection terminal 41 to make an electrical connection between them.

In this embodiment, the conductive layer 40 also serves as a sealing material of the liquid crystal display unit 1. Hence, it is desirable that the diameter of the conductive beads 40B be determined taking the gap between substrates of the liquid crystal display unit into consideration. This embodiment uses plastic balls coated with gold as the conductive beads. Conductive fibers also provide a similar effect. Hence, the conductive beads 40B fall within the category of this embodiment as long as they are conductive beads or fibers.

Figure 26:
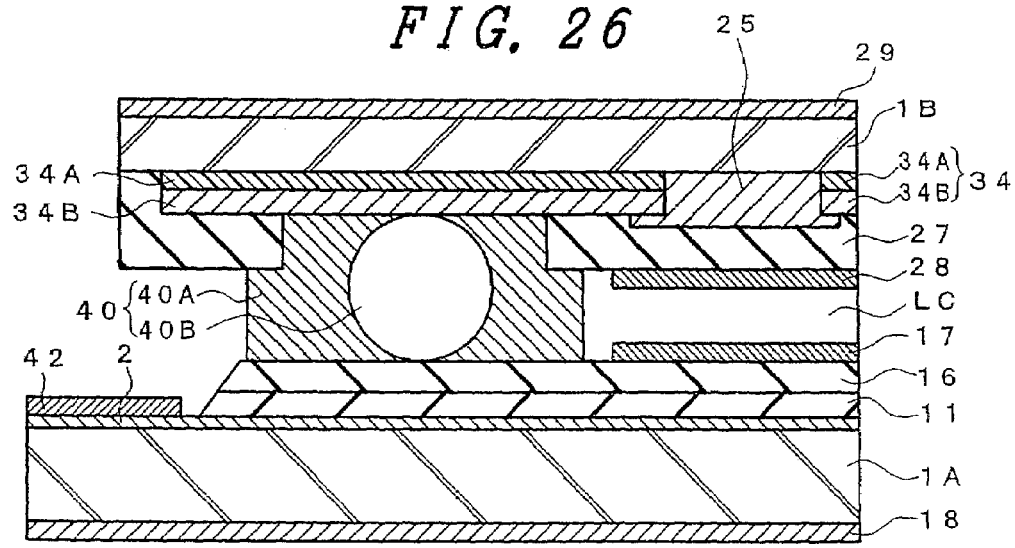
FIG. 26 is a cross section of Embodiment 10.

The connection terminals for the scan signal line 2 and the vertical scanning circuit 5 and the connection terminals for the video signal line 3 and the video signal drive circuit 6 are generally formed of a single ITO layer or a multilayer structure with the ITO layer at the top. One example of the cross-sectional structure of the connection terminal portion for the scan signal line 2 and the vertical scanning circuit 5 is shown in FIG. 26.

In the figure, the connection terminal 42 for the scan signal line 2 and the vertical scanning circuit 5 is formed in the same layer where the connection terminal 41 is provided. In this embodiment, the connection terminal for the video signal line 3 and the video signal drive circuit 6 is also formed in the same layer where the connection terminal 41 is provided. This construction eliminates the need for an additional process of forming the connection terminal 41.

As described above, to prevent contamination of the liquid crystal it is desirable that the conductive layer is not in direct contact with the liquid crystal. Hence, this embodiment is so constructed that the area in which the light shielding layer 34 is electrically connected with the connection terminal 41 does not extend into the area of the liquid crystal layer.

Figure 27:
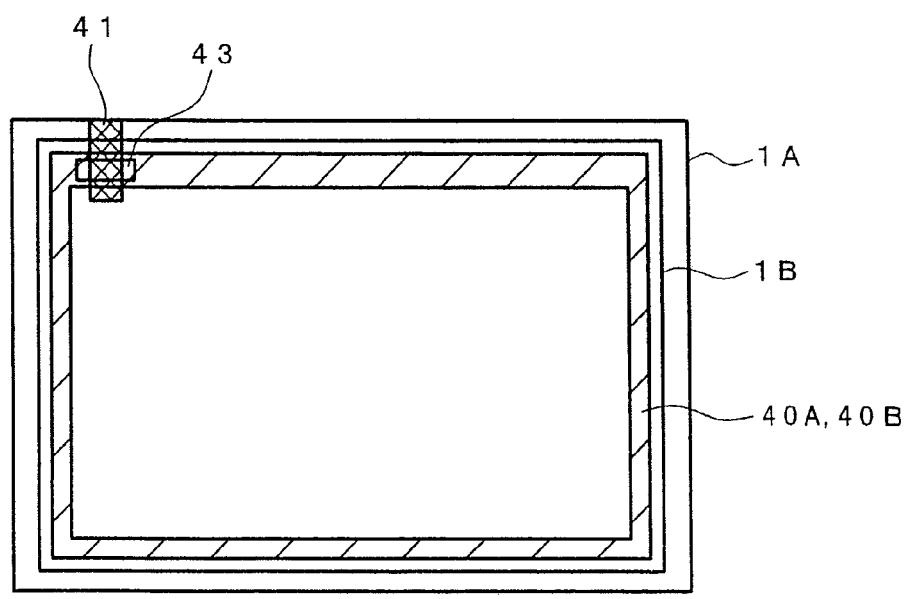
FIG. 27 is a plan view of Embodiment 10.

FIG. 27 shows a schematic plan view of the connection between the light shielding layer 34 and the connection terminal 41. The connection terminal 41 is formed over the transparent substrate 1A and the light shielding layer is formed as a matrix over the transparent substrate 1B as shown in FIG. 21.

Liquid crystal is sealed in an area enclosed by the conductive layer 40 that also serves as a sealing material. Normally, in the liquid crystal filling port region the sealing material is not formed. Instead, only after the liquid crystal is sealed, will the sealing material be formed to seal the liquid crystal. This is ignored in FIG. 27 since it is a schematic explanatory view. In the rectangular region 43 the passivation film 27 is not provided, so that electrical connection can be made between the light shielding layer 34 and the connection terminal 41 by conductive beads.

The connection terminal 41 and the LCD driver power circuit 7 are electrically connected by independent wires. It is possible to use at least one of the connecting wires of the video signal line 3 and the video signal drive circuit 6 to connect the connection terminal 41 and the LCD driver power circuit 7. At least one of the connecting wires for the scan signal line 2 and the vertical scanning circuit 5 may also be used for connecting the connection terminal 41 and the LCD driver power circuit 7.

Next, the relation between the alignment layer 17 and the polarizing plate 18 formed on the transparent substrate 1A and the relation between the alignment layer 28 and the polarizing plate 29 formed on the transparent substrate 1B will be described with reference to FIG. 9.

The rubbing directions 208 of the alignment layers 17 and 28 are at an angle $\phi LC$ of 85 degrees with respect to the direction 207 of the electric field applied between the display electrode 15 and the reference electrodes 14. The polarized light transmitting axis 209 of polarizing plate 18 is at an angle $\phi P$ equal to $\phi LC$. The other polarizing plate 29 has a polarized light transmitting axis perpendicular to 209. The liquid crystal layer LC uses a nematic liquid crystal material having a positive dielectric constant anisotropy $\Delta \in$ of 7.3 (1 kHz) and a refractive index anisotropy $\Delta n$ of 0.073 (589 nm, 20° C.).

With this arrangement, generating an electric field parallel to the transparent substrate 1A in the liquid crystal layer LC makes it possible to modulate the light passing through the liquid crystal layer LC.

As long as a construction is employed in which the light passing through the liquid crystal layer can be modulated by a in-plane field, it is obvious that there are no restrictions on the structure of the alignment layer and polarizing plate and the material of the liquid crystal.

Any light shielding layer 34 having a layer 34A with a reflectance of less than about 10% and a layer 34B made of at least one of Al, Cr, Mo, Ta, Ti, W and their alloys falls in the scope of this embodiment.

Embodiment 11

Figure 28:
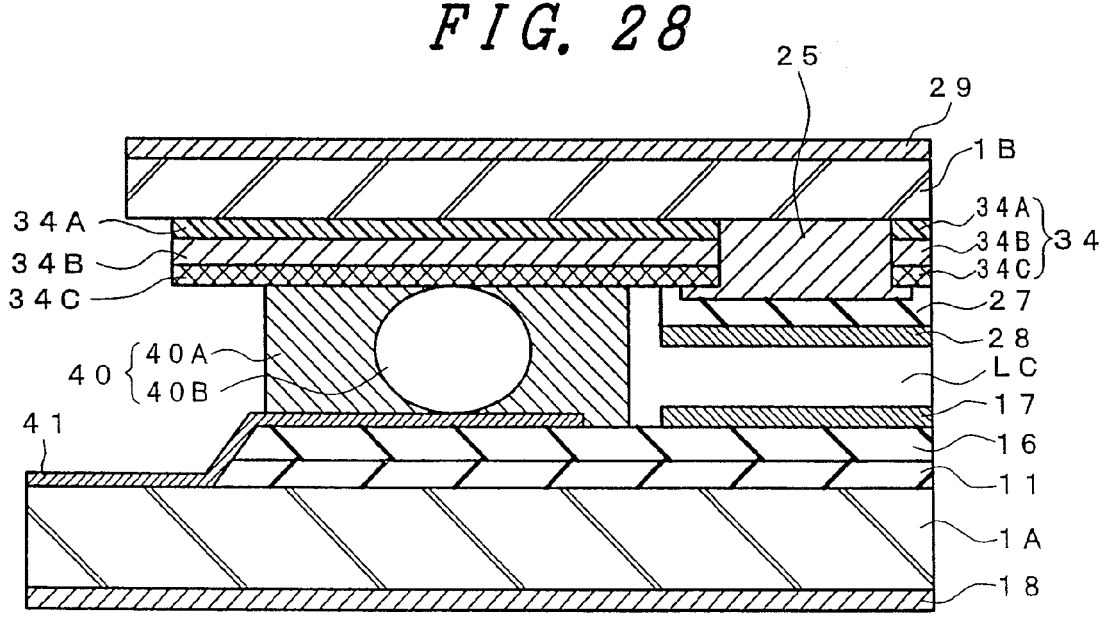
FIG. 28 is a cross section of Embodiment 11.

The difference between this embodiment and Embodiment 10 is the structure of the light shielding layer 34. FIG. 28 is a schematic cross section showing the structure of the terminal portion.

In this embodiment, the light shielding layer 34 comprises three layers 34A, 34B, 34C. The layer 34A is made of CrO, 34B Cr and 34C ITO. This embodiment therefore can produce the same effect as that of Embodiment 10. Further in this embodiment, the innermost layer 34C of the shield electrode 34 on the liquid crystal layer side is formed of ITO.

This construction can improve the reliability of the connection between the light shielding layer and the conductive layer 40. Because the surface of the light shielding layer on the liquid crystal layer side is made of ITO, contamination by the light shielding layer of the liquid crystal can be prevented, which makes it possible to provide even in the liquid crystal layer an area where the light shielding layer is exposed. As a result, the connection region where the light shielding layer 34 and the connection terminal 41 are connected by the conductive layer 40 can be formed almost flat, thus reducing the contact resistance and improving the precision of the gap between the substrates of the liquid crystal display unit.

This embodiment includes a modification where the ITO layer 34c of the light shielding layer 34 is not formed in the display area of the liquid crystal display unit. In this case, because the layer 34C cannot be simultaneously patterned together with the other layers 34A and 34B when forming the light shielding layer 34, the number of processes increases. However, because the ITO residues can be prevented from entering the display area during the ITO etching, a defective display caused by the ITO residues can be reduced, improving the yield.

Embodiment 12

Figure 29:
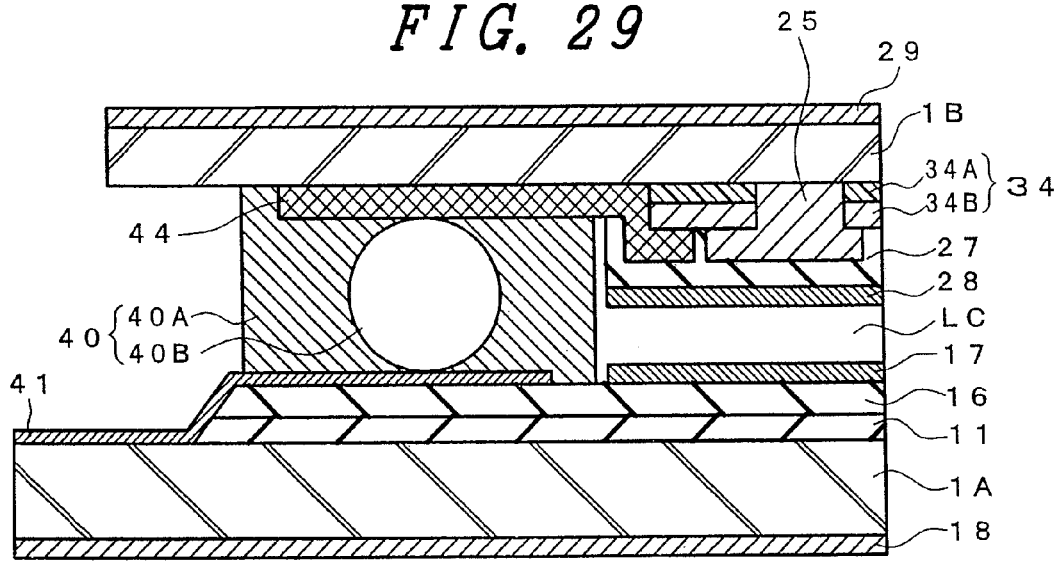
FIG. 29 is a cross section of Embodiment 12.

The difference between Embodiment 12 and Embodiment 10 lies in the structure of the connecting portion between the light shielding layer 34 and the connection terminal 41. FIG. 29 is a schematic cross section showing the construction of the terminal portion.

In this embodiment, an electrical connection between the conductive layer 40 and the light shielding layer 34 is achieved by a light shielding layer connection terminal 44 connected to the light shielding layer 34. This embodiment uses ITO for the light shielding layer connection terminal 44.

In this embodiment the region directly connected to the conductive layer 40 is formed as a low-corrosiveness ITO single layer, so that the corrosion resistance of the connecting portion can be improved compared with Embodiment 11.

Embodiment 13

Figure 30:
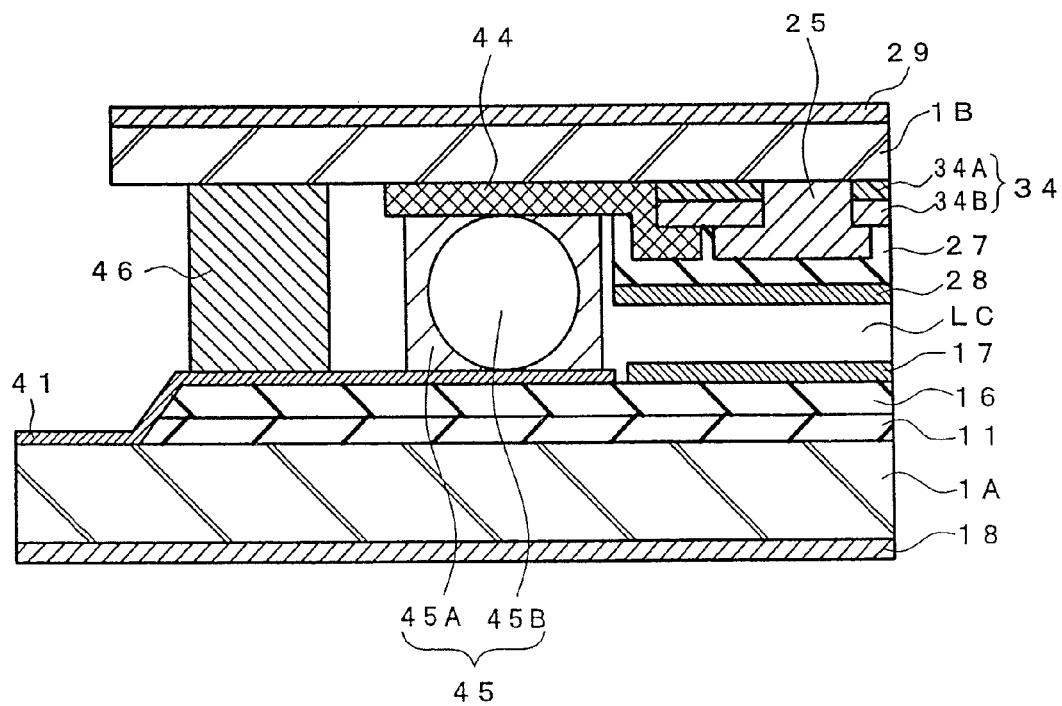
FIG. 30 is a cross section of Embodiment 13.

The difference between this embodiment and Embodiment 12 lies in the structure of the connecting portion between the light shielding layer 34 and the connection terminal 41. FIG. 30 is a schematic cross section showing the construction of the connecting portion.

In this embodiment, the conductive layer electrically connecting the light shielding layer 34 with the connection terminal 41 is formed separately from the sealing material.

In Embodiment 12, conductive beads are used for the beads in the sealing material that support the gap between the substrates, so that the connecting portion functions both as the sealing material and the conductive layer 40. In this embodiment, however, sealing material 46 in the form of an insulating material and a conductive layer 45 are provided separately. The sealing material 46 is a resin where insulating plastic fibers are dispersed, and the conductive layer 45 uses a material similar to the conductive layer 40 of Embodiment 12. The conductive layer 45 of this embodiment comprises the resin 45A wherein conductive beads 45B prepared by coating plastic beads with gold over the surface are dispersed.

In this embodiment, the conductive layer 45 is formed inside the sealing material 46, i.e., in the area of the liquid crystal layer, so that degradation of the conductive layer 45 due to moisture in the open air can be prevented.

Figure 31:
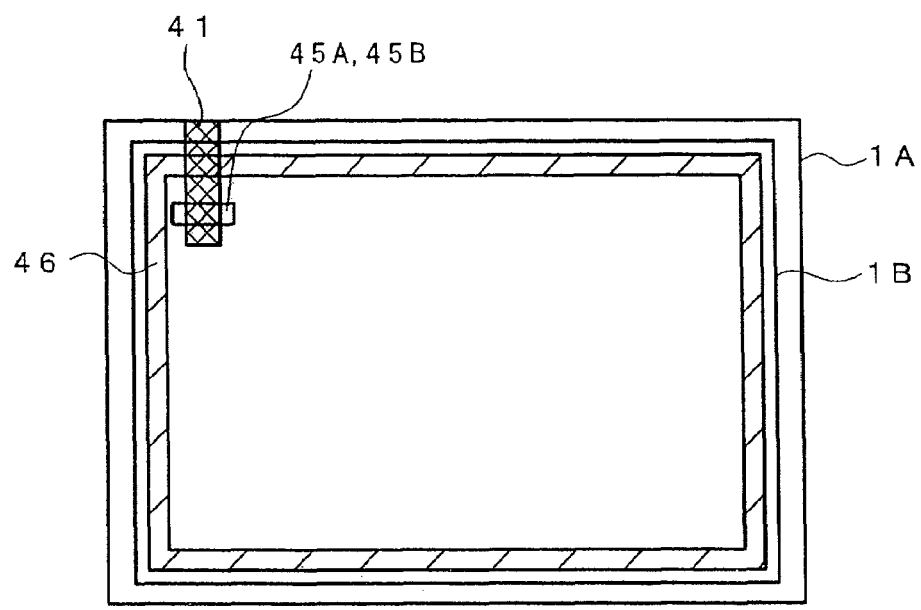
FIG. 31 is a plan view of Embodiment 13.

FIG. 31 is a schematical plan view showing the configuration of the connection between the light shielding layer 34 and the connection terminal 41 of this embodiment.

The conductive layer 45 is formed inside a rectangular area enclosed by the sealant material 46. The area of the conductive layer 45, as shown in FIG. 31, is smaller than that of the sealing material 46. As a result, the amount of conductive beads or conductive fibers in the conductive layer can be reduced significantly. The conductive beads or conductive fibers are generally made of an insulating material coated with gold and are very expensive. Hence, the reduced amount of these materials can reduce the material cost compared with Embodiment 12.

Embodiment 14

The difference between this embodiment and Embodiment 13 is that the conductive layer 45 is formed outside the rectangular area enclosed by the sealing material 46. Like Embodiment 13, this construction can also offer the advantage of a reduced material cost. Further, because this embodiment does not need consideration of contamination of the liquid crystal material by the conductive layer 45, a less expensive material such as silver paste can be used for the conductive layer 45, further reducing the material cost compared with the configuration of Embodiment 13.

Embodiment 15

Figure 32:
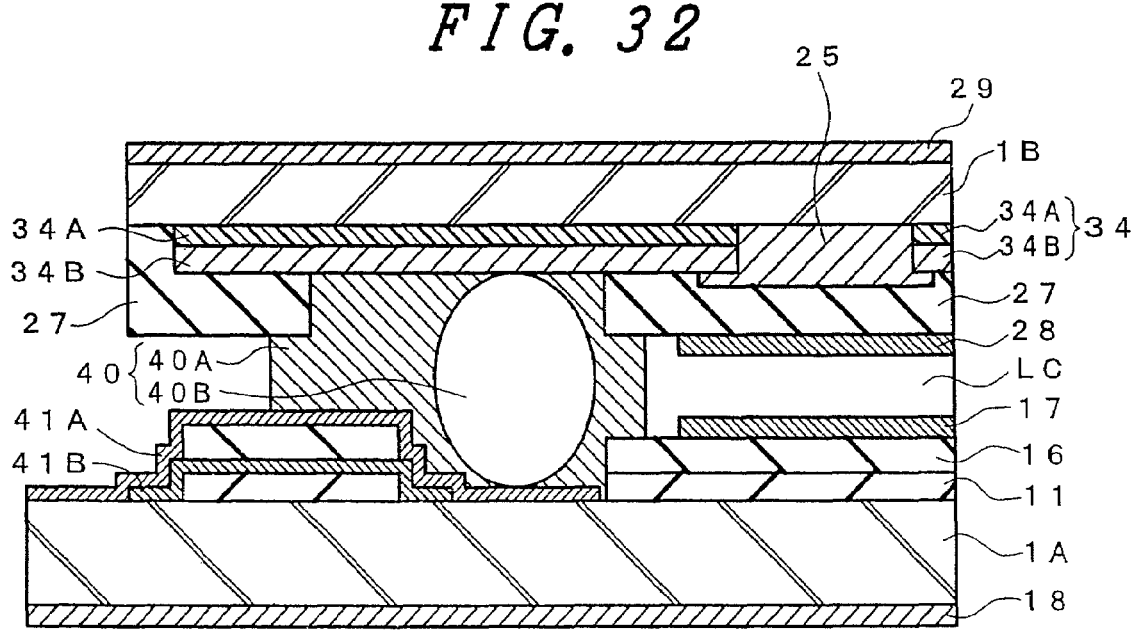
FIG. 32 is a cross section of Embodiment 15.

The difference between this embodiment and Embodiment 10 is the construction of the connection terminal 41. FIG. 32 is a schematic cross section showing the construction of the terminal portion.

In this embodiment, the connection terminal 41 has two or more layers. In this example, the connection terminal 41 has two layers 41A, 41B, the layer 41A being made of ITO and the layer 41B being made of the same material as the video signal line. This reduces the probability of disconnection failure of the connection terminal 41, improving the reliability and the yield compared with Embodiment 10. Since the resistance of the connecting portion is reduced, the resistance of the connection from the LCD driver power circuit to the light shielding layer 34 can also be reduced. Further, because the layer 41B can be formed together with the video signal line, the number of processes does not increase. This is also true when the layer 41B is made of the same material as that of the scan signal line. It is also noted that while the layers 41A and 41B have a passivation film 16 interposed therebetween in some area, a structure without such an interposed passivation film is also included in this embodiment.

As can be seen from the foregoing description, the liquid crystal display device of this invention can minimize the so-called vertical smear and reduce the power consumption and the size of the peripheral circuits. Further, the aperture ratio can be improved. Moreover the invention can minimize the brightness gradient and horizontal smear and lower the reflectance.

This invention, applied to liquid crystals as described above, has a practical applicability in the liquid crystal manufacturing industry.

What is claimed is:

1. An active matrix liquid crystal display device comprising:
   a pair of substrates with a liquid crystal layer therebetween;
   a plurality of video signal lines and a plurality of scan signal lines formed on one of the pair of substrates and a plurality of display electrodes connected to the video signal line through an active device;

pixel areas being defined by the video signal lines and the scan signal lines which are formed in the shape of a matrix; and the display electrodes, reference electrodes and the active devices being arranged in the pixel areas;

wherein the display electrodes are arranged on one of the pair of substrates, and the reference electrodes are arranged on another of the pair of substrates;

wherein a part of the reference electrodes have a first layer formed in the substrate side and a second layer formed in the liquid crystal layer side; and wherein each of the display electrodes and the reference electrodes has a slit, the slit of the display electrodes and the slit of the reference electrodes being shifted with respect to one another in plan view.

2. An active matrix liquid crystal display device according to claim 1, wherein the first layer is formed by a material of low reflectance, and the second layer is formed by a material of high electric conductivity.

3. An active matrix liquid crystal display device according to claim 2, wherein the first layer is formed by the organic materials including carbon.

4. An active matrix liquid crystal display device according to claim 3, wherein the first layer is formed by a metal material.

5. An active matrix liquid crystal display device according to claim 4, wherein the first layer is formed of molybdenum.

6. An active matrix liquid crystal display device according to claim 3, wherein the second layer is formed by a metal material.

7. An active matrix liquid crystal display device according to claim 4, wherein the first layer is formed of chromium.

* * * * *